United States Patent
Birmingham

(10) Patent No.: US 10,807,119 B2
(45) Date of Patent: Oct. 20, 2020

(54) ELECTROSPRAY PINNING OF NANOGRAINED DEPOSITIONS

(71) Applicant: Birmingham Technologies, Inc., Arlington, VA (US)

(72) Inventor: Joseph G. Birmingham, Arlington, VA (US)

(73) Assignee: Birmingham Technologies, Inc., Arlington, VA (US)

(*) Notice: Subject to any disclaimer, the term of this patent is extended or adjusted under 35 U.S.C. 154(b) by 550 days.

(21) Appl. No.: 14/198,143

(22) Filed: Mar. 5, 2014

(65) Prior Publication Data

US 2015/0251213 A1 Sep. 10, 2015

Related U.S. Application Data

(60) Provisional application No. 61/824,909, filed on May 17, 2013.

(51) Int. Cl.
*B05D 1/00* (2006.01)
*B22F 3/105* (2006.01)
(Continued)

(52) U.S. Cl.
CPC .............. *B05D 1/007* (2013.01); *B05B 5/001* (2013.01); *B05D 1/06* (2013.01); *B22F 3/1055* (2013.01);
(Continued)

(58) Field of Classification Search
CPC ............. B33Y 30/00; B22F 2003/1056; B22F 2003/1058; B22F 2009/0836; C23C 4/123; B05B 5/001
See application file for complete search history.

(56) References Cited

U.S. PATENT DOCUMENTS 2,876,368 A 3/1959 Thomas
4,264,641 A 4/1981 Mahoney et al.
(Continued)

FOREIGN PATENT DOCUMENTS

JP 5147901 6/2017
WO 2009004345 1/2009
WO 2017214179 12/2017

OTHER PUBLICATIONS

Baram, M. et al., "Nanometer-Thick Equilibrium Films: The Interface Between Thermodynamics and Atomistics," Science, vol. 332, Issue 6026, pp. 206-209 (2011).
(Continued)

*Primary Examiner* — Dah-Wei D. Yuan
*Assistant Examiner* — Stephen A Kitt
(74) *Attorney, Agent, or Firm* — Lieberman & Brandsdorfer, LLC

(57) ABSTRACT

A method and apparatus for fabrication of objects retaining nano-scale characteristics. A composition is provided comprising grain growth inhibitor particles in solution with a binding agent in a molten phase. An electric field and a magnetic field are generated with a combined extraction electrode. The composition is electrosprayed from a nozzle with the electric field to form a stream of droplets. The electric field drives the droplets toward a moving stage holding an object comprising successive deposition layers. The magnetic field limits dispersion of the stream of droplets. The stage is moved laterally as the stream of droplets impacts the object to form a current deposition layer of the object. The stage is moved vertically as necessary to maintain a target stand-off distance between the nozzle and a previous deposition layer of the object, based on profile data of the previous deposition layer.

8 Claims, 10 Drawing Sheets

(51) Int. Cl.
| | | |
|---|---|---|
| *B22F 9/08* | (2006.01) | |
| *B05B 5/00* | (2006.01) | |
| *B05D 1/06* | (2006.01) | |
| *G01B 11/24* | (2006.01) | |
| *C23C 4/123* | (2016.01) | |

(52) U.S. Cl.
CPC .............. *B22F 9/082* (2013.01); *C23C 4/123* (2016.01); *G01B 11/24* (2013.01); *B22F 2003/1056* (2013.01); *B22F 2009/0836* (2013.01); *B22F 2009/0844* (2013.01); *B22F 2009/0852* (2013.01); *B22F 2009/0888* (2013.01); *Y02P 10/295* (2015.11)

(56) References Cited

U.S. PATENT DOCUMENTS

| | | | |
|---|---|---|---|
| 4,628,143 A | 12/1986 | Brotz | |
| 4,762,975 A | 8/1988 | Mahoney et al. | |
| 4,900,368 A | 2/1990 | Brotz | |
| 5,008,579 A | 4/1991 | Conley et al. | |
| 5,578,886 A | 11/1996 | Holmlid et al. | |
| 5,606,213 A | 2/1997 | Kherani et al. | |
| 5,787,965 A * | 8/1998 | Sterett ............... | B33Y 30/00 164/155.3 |
| 5,960,853 A | 10/1999 | Sterett et al. | |
| 5,989,824 A | 11/1999 | Birmingham et al. | |
| 5,994,638 A | 11/1999 | Edelson | |
| 6,062,392 A | 5/2000 | Birmingham et al. | |
| 6,110,247 A | 8/2000 | Birmingham et al. | |
| 6,287,714 B1 | 9/2001 | Xiao et al. | |
| 6,294,858 B1 | 9/2001 | King et al. | |
| 6,722,872 B1 * | 4/2004 | Swanson ............ | B29C 41/36 425/225 |
| 6,774,532 B1 | 8/2004 | Marshall et al. | |
| 7,073,561 B1 * | 7/2006 | Henn ................. | B22F 3/003 164/94 |
| 7,259,109 B2 | 8/2007 | Meagley | |
| 7,327,026 B2 | 2/2008 | Shimogishi et al. | |
| 7,524,528 B2 | 4/2009 | Kodas et al. | |
| 7,651,926 B2 | 1/2010 | Jacobson et al. | |
| 7,701,576 B2 | 4/2010 | Moore et al. | |
| 7,906,182 B1 | 3/2011 | Schlaf | |
| 8,093,144 B2 | 1/2012 | Jacobson et al. | |
| 8,182,982 B2 | 5/2012 | Korbin | |
| 8,192,920 B2 | 6/2012 | Korbin | |
| 8,318,386 B2 | 11/2012 | Korbin | |
| 8,334,217 B2 | 12/2012 | Korbin | |
| 8,367,525 B2 | 2/2013 | Jacobson et al. | |
| 8,425,789 B2 | 4/2013 | Kobrin | |
| 8,518,633 B2 | 8/2013 | Kobrin et al. | |
| 8,907,352 B2 | 12/2014 | Naito | |
| 9,069,244 B2 | 6/2015 | Kobrin | |
| 9,073,937 B2 | 7/2015 | Frazier et al. | |
| 9,116,430 B2 | 8/2015 | Kobrin et al. | |
| 9,465,296 B2 | 10/2016 | Kobrin | |
| 9,481,112 B2 | 11/2016 | Kobrin et al. | |
| 9,645,504 B2 | 5/2017 | Kobrin | |
| 9,782,917 B2 | 10/2017 | Kobrin et al. | |
| 9,981,410 B2 | 5/2018 | Kobrin et al. | |
| 2005/0104185 A1 | 5/2005 | Shimogishi et al. | |
| 2010/0068406 A1 * | 3/2010 | Man .................... | B05D 1/60 427/469 |
| 2011/0148248 A1 | 6/2011 | Landa | |
| 2012/0153772 A1 | 6/2012 | Landa | |
| 2013/0101729 A1 * | 4/2013 | Keremes ............ | B23K 26/34 427/8 |
| 2015/0229013 A1 | 8/2015 | Birmingham et al. | |
| 2017/0252807 A1 | 9/2017 | Lund et al. | |

OTHER PUBLICATIONS

Bassani, J.L., "Incompatibility and a simple gradient theory of plasticity," Journal of Mechanics and Physics of Solids vol. 49, pp. 1983-1996 (2001).

Darling, K.A. et al., "Thermal stability of nanocrystalline Fe-Zr alloys," Materials Science and Engineering A, vol. 527, pp. 3572-3580 (2010).

De Juan, L. et al., "Charge and Size Distributions of Electrospray Drops," Journal of Colloid Interface Science, vol. 186, pp. 280-293 (1997).

Detor, Andrew J. et al., "Grain boundary segregation, chemical ordering and stability of nanocrystalline alloys: Atomistic computer simulations in the Ni-W system," Acta Materialia, vol. 55, pp. 4221-4232 (2007).

Gudmundson, Peter, "A unified treatment of strain gradient plasticity," Journal of the Mechanics and Physics of Solids, vol. 52, pp. 1379-1406 (2004).

Hentschel, T. et al., "Nanocrytsalline Ni-3.6 at.% P and its Transformation Sequence Studied by Atom-Probe Field-Ion Microscopy," Acta Materialia, vol. 48, pp. 933-941 (2000).

Kirchheim, Reiner, "Grain coarsening inhibited by solute segregation," Acta Materialia, vol. 50, pp. 413-419 (2002).

Kirchheim, Reiner, "Reducing grain boundary, dislocation line and vacancy formation energies by solute segregation. I. Theoretical backround," Acta Materialia, vol. 55, pp. 5129-5138 (2007).

Kirchheim, Reiner, "Reducing grain boundary, dislocation line and vacancy formation energies by solute segregation II. Experimental evidence and consequences," Acta Materialia, vol. 55, pp. 5139-5148 (2007).

Koch, C.C. et al., "Ductility of Nanostructured Materials," Materials Research Society Bulletin, vol. 24, pp. 54-58 (1999).

Legros, M. et al., "Microsample tensile testing of nanocrystalline metals," Philosophical Magazine A, vol. 80, No. 4, pp. 1017-1026 (2000).

Luo, Jian et al., "The Role of a Bilayer Interfacial Phase on Liquid Metal Embrittlement," Science, vol. 333, Issue 6050, pp. 1730-1733 (2011).

Millett, Paul C. et al., "Stabilizing nanocrystalline materials with dopants," Acta Materialia, vol. 55, pp. 2329-2336 (2007).

Moon, Kyoung Il et al., "A study of the microstructure of nanocrystalline Al-Ti alloys synthesized by ball milling in a hydrogen atmosphere and hot extrusion," Journal of Alloys Compounds, vol. 291, pp. 312-321 (1999).

Nan, C.W. et al., "The Influence of Particle Size and Particle Fracture on the Elastic/Plastic Deformation of Metal Matrix Composites," Acta Materialia, vol. 44, No. 9, pp. 3801-3811 (1996).

Perepezko, J.H., et al., "Amorphization and nanostructure synthesis in Al alloys", Intermetallics 10 (2002) p. 1079-1088.

Sanders, P.G. et al., "The strength of nanocrystalline metals with and without flaws," Materials Science Engineering 4, vol. 234-236, pp. 77-82 (1997).

Sanders, P.G. et al., "Elastic and Tensile Behavior of Nanocrystalline Copper and Palladium," Acta Materialia, vol. 45, No. 10, pp. 4019-4025 (1997).

Scoville, N. et al., "Thermal Conductivity Reductions in SiGe Via Addition of Nanophase Particles," Materials Research Society Symposium Proceedings, vol. 351, pp. 431-436 (1994).

Sekine, H. et al., "A combined microstructure strengthening analysis of SiC-p/Al metal matrix composites," Composites, vol. 26, pp. 183-188 (1995).

Taylor, Geoffrey, "Disintegration of water drops in an electric field," Proceedings of the Royal Society A, vol. 280, pp. 383-397 (1964).

Tsuji, N. et al., "Strength and ductility of ultrafine grained aluminum and iron produced by ARB and annealing," Scripta Materialia, vol. 47, pp. 893-899 (2002).

Valiev, R.Z. et al., "Paradox of strength and ductility in metals processed by severe plastic deformation," Journal of Materials Research, vol. 17, No. 1, pp. 5-8 (2002).

Vanherpe, L. et al., "Pinning effect of spheroid second-phase particles on grain growth studied by three-dimensional phase-field simulations", Computational Materials Science 49 (2010) 340-350.

Wang, Y. et al.,"High tensile ductility in a nanostructured metal", Nature, 419 (2002), 912-915.

Wang, Y. M. et al., "Enhanced tensile ductility and toughness in nanostructured Cu," Applied Physics Letters, vol. 80, pp. 2395-2397 (2002).

(56) References Cited

OTHER PUBLICATIONS

Weertman, J.R. et al., "Structure and Mechanical Behavior of Bulk Nanocrystalline Materials," Materials Research Society Bulletin, vol. 24, pp. 44-50 (1999).

Weissmuller, J., "Alloy Effects in Nanostructures" Nanostructured Materials, vol. 3, pp. 261-272 (1993).

Xiao, T.D. et al., "Synthesis of Nanostructured Ni/Cr and Ni-Cr3C2 Powders by an Organic Solution Reaction Method," Nanostructured Materials, vol. 7, No. 8, pp. 857-871 (1996).

Yamasaki, T. et al., "Formation of metal-TiN/TiC nanocomposite powders by mechanical alloying and their consolidation," Materials Science and Engineering A, vol. 350, pp. 168-172 (2003).

Battezzati, L. et al., "Solid state reactions in Al/Ni alternate foils induced by cold rolling and annealing," Acta Materialia, vol. 47, Issue 6, pp. 1901-1914 (1999).

Dinda, G.P. et al., "Synthesis of bulk nanostructured Ni, Ti and Zr by repeated cold-rolling," Scripta Materialia, vol. 52, Issue 7, pp. 577-582 (2005).

Fernandez De La Mora, J. et al., "Generation of submicron monodisperse aerosols by electrosprays," Journal of Aerosol Science, vol. 21, Suppl. 1, pp. s673-s676 (1990).

Gertsman, V. Y. et al., "Deformation behavior of ultrafine-grained materials," Materials Science Forum, vols. 225-227, pp. 739-744 (1996).

Jaworek, A., "Electrospray droplet sources for thin film deposition," Journal of Materials Science, vol. 42, Issue 1, pp. 266-297 (2007).

Koch, C.C., "Synthesis of nanostructured materials by mechanical milling: problems and opportunities," Nanostructured Materials, vol. 9, Issues 1-8, pp. 13-22 (1997).

Koch, C.C. et al., "Stabilization of nanocrystalline grain sizes by solute additions," Journal of Materials Science, vol. 43, Issue 23-24, pp. 7264-7272 (2008).

Lee, Z. et al., "Bimodal microstructure and deformation of cryomilled bulk nanocrystalline Al-7.5Mg alloy," Materials Science and Engineering A, vols. 410-411, pp. 462-467 (2005).

Lloyd, D.J., "Particle reinforced aluminum and magnesium matrix composites," International Materials Reviews, vol. 39, Issue 1, pp. 1-23 (1994).

Mayr, S.G. et al., "Stabilization of Cu nanostructures by grain boundary doping with Bi: Experiment versus molecular dynamics simulation," Physical Review B, vol. 76, p. 024111 (2007).

McCandlish L.E. et al., "Chemical processing of nanophase WC—Co composite powders," Materials Science and Technology, vol. 6, Issue 10, pp. 953-957 (1990).

Mortensen, A. et al., "Metal Matrix Composites," Annual Review of Materials Research, vol. 40, pp. 243-270 (2010).

Nabarro, F.R.N., "The theory of solution hardening," The Philosophical Magazine: A Journal of Theoretical Experimental and Applied Physics, vol. 35, pp. 613-622 (1977).

Valiev, R. Z. et al., "Bulk nanostructured materials from severe plastic deformation," Progress in Materials Science, vol. 45, pp. 103-189 (2000).

Valiev, R.Z. et al., "Producing Bulk Ultrafine-Grained Materials by Severe Plastic Deformation," Journal of Materials, vol. 58, Issue 4, p. 33 (2006).

Xiao, T.D. et al., "Synthesis of Si(N,C) nanostructured powders from an organometallic aerosol using a hot-wall reactor," Journal of Materials Science, vol. 28, pp. 1334-1340 (1993).

Bell, Lon E., "Cooling, heating, generating power, and recovering waste heat with thermoelectric systems," Science, vol. 321, pp. 1457-1461 (2008).

Brezonik, Patrick L. et al., "Water Chemistry: An Introduction to the Chemistry of Natural and Engineered Aquatic Systems," Oxford University Press, Inc., pp. 170-175 (2011).

Chung, M.S. et al., "Energy exchange processes in electron emission at high fields and temperatures," Journal of Vacuum Science and Technology B, vol. 12, pp. 727-736 (1994).

Cronin, J.L., "Modern dispenser cathodes," IEE Proc., vol. 128, Pt. 1, No. 1, pp. 19-32 (1981).

Curzon, F.L. et al., "Efficiency of a Carnot engine at maximum power output," American Journal of Physics, vol. 43, pp. 22-24 (1975).

Cutler, P.H. et al., "A new model for the replacement process in electron emission at high fields and temperatures," Applied Surface Science, vol. 76-77, pp. 1-6 (1994).

Daniel, Marie-Christine et al., "Gold Nanoparticles: Assembly, Supramolecular Chemistry, Quantum-Size-Related Properties, and Applications toward Biology, Catalysis, and Nanotechnology," Chemical Reviews, vol. 104, No. 1, pp. 293-346 (2004).

Deng et al., "Digital electrospray for controlled deposition," Review of Scientific Instruments, vol. 81, pp. 035114-1-035114-6 (2010).

Deng, Weiwei et al., "Influence of space charge on the scale-up of multiplexed electrosprays," Aerosol Science 38, pp. 1062-1078 (2007).

Dillner, U., "The effect of thermotunneling on the thermoelectric figure of merit," Energy Conversion and Management, vol. 49, No. 12, pp. 3409-3425 (2008).

Fisher, T.S. et al., "Thermal and Electrical Energy Transport and Conversion in Nanoscale Electron Field Emission Processes," Journal of Heat Transfer, vol. 124, pp. 954-962 (2002).

Fu, Xinyong et al., "Realization of Maxwell's Hypothesis," Shanghai Jiao Tong University (2008).

Hishinuma, Y. et al., "Refrigeration by combined tunneling and thermionic emission in vacuum: use of nanometer scale design," Applied Physics Letters, vol. 78, No. 17, pp. 2572-2574 (2001).

Hishinuma, Yoshikazu et al., "Measurements of cooling by room-temperature thermionic emission across a nanometer gap," Journal of Applied Physics, vol. 94, No. 7, p. 4690 (2003).

Ioffe, A.F., "Semiconductor Thermoelements and Thermoelectric Cooling Infosearch," Infosearch Ltd., 1957.

Klimeck et al., "Quantum device simulation with a generalized tunneling formula," Appl. Phys. Lett., vol. 67, pp. 2539-2541 (1995).

Koeck, Franz A.M. et al., "Thermionic electron emission from low work-function phosphorus doped diamond films," Diamond Related Material, vol. 18, pp. 789-791 (2009).

Landauer, R., "Spatial Variation of Currents and Fields Due to Localized Scatterers in Metallic Conduction," IBM Journal of Research and Development, vol. 1, pp. 223-231 (1957).

Likharev, Konstantin K., "Single-Electron Devices and Their Applications," Proc. IEEE, vol. 87, pp. 606-632 (1999).

Mahan, G.D., "Thermionic refrigeration," Journal of Applied Physics, vol. 76, No. 7, pp. 4362-4366 (1994).

Marzari, Nicola et al., "Maximally localized generalized Wannier functions for composite energy bands," Physical Review B, vol. 56, No. 20, pp. 12847-12865 (1997).

Muller-Steinhagen, Hans et al., "Concentrating solar power," Ingenia, pp. 1-9 (2004).

Murray, Royce W., "Nanoelectrochemistry: Metal Nanoparticles, Nanoelectrodes, and Nanopores," Chemical Reviews, vol. 108, No. 7, pp. 2688-2720 (2008).

Obraztsov, Alexander et al., "Cold and Laser Stimulated Electron Emission from Nanocarbons," Journal Nanoelectronics and Optoelectronics, vol. 4, pp. 1-13 (2009).

Redko, Mikhail et al., "Design and Synthesis of a Thermally Stable Organic Electride," J. Am. Chem. Soc., vol. 127, No. 35, pp. 12416-12422 (2005).

Rusu, Paul et al., "Work functions of self-assembled monolayers on metal surfaces by first-principles calculations," Physical Review B, vol. 74, pp. 073414-1-073414-4 (2006).

Scheible, Dominik V. et al., "Tunable coupled nanomechanical resonators for single-electron transport," New Journal of Physics, vol. 4, pp. 86.1-86.7 (2002).

Schreiber, Frank, "Structure and growth of self-assembling monolayers," Progress in Surface Science, vol. 65, pp. 151-256 (2000).

Shakouri, Ali, "Nanoscale Thermal Transport and Microrefrigerators on a Chip," Proceedings of the IEEE, vol. 94, No. 8, pp. 1613-1638 (2006).

Shockley, William et al., "Detailed Balance Limit of Efficiency of pn Junction Solar Cells," Journal of Applied Physics, vol. 32, pp. 510-519 (1961).

(56) References Cited

OTHER PUBLICATIONS

Snider, D.R. et al., "Variational calculation of the work function for small metal spheres," Solid State communications, vol. 47, No. 10, pp. 845-849 (1983).
Snyder, G. et al., "Complex thermoelectric materials," Nature Materials, vol. 7, pp. 105-114 (2008).
Sodha, M.S. et al., "Dependence of Fermi energy on size," Journal of Physics D: Applied Physics, vol. 3, No. 2, pp. 139-144 (1970).
Stephanos, Cyril, "Thermoelectronic Power Generation from Solar Radiation and Heat," University of Augsburg, Ph. D. Thesis, Nov. 2012.
Templeton, Allen C. et al., "Monolayer-Protected Cluster Molecules," Accounts of Chemical Research, vol. 33, No. 1, pp. 27-36 (2000).
Tepper, Gary et al., "An electrospray-based, ozone-free air purification technology," Journal of Applied Physics, vol. 102, pp. 113305-1-113305-6 (2007).
Thygesen, Kristian S. et al., "Partly occupied Wannier functions," Physical Review Letters, vol. 94, pp. 026405-1-026405-4 (2005).
Ulrich, Marc D. et al., "Comparison of solid-state thermionic refrigeration with thermoelectric refrigeration," Journal of Applied Physics, vol. 90, No. 3, pp. 1625-1631 (2001).
Wada, Motoi et al., "Effective Work Function of an Oxide Cathode in Plasma," J. Plasma Fusion Res. Series, vol. 8, pp. 1366-1369 (2009).
Watanabe, Satoru et al., "Secondary electron emission and glow discharge properties of 12CaO-7Al2O3 electride for fluorescent lamp applications," Science and Technology of Advanced Materials, vol. 12, pp. 1-8 (2011).
Weaver, Stan et al., "Thermotunneling Based Cooling Systems for High Efficiency Buildings," GE Global Research, Doe Project: DE-FC26-04NT42324 (2007).
Weiss, C. et al., "Accuracy of a mechanical single-electron shuttle," Europhysics Letters, vol. 47, No. 1, p. 97 (1999).
Yamamoto, Shigehiko, "Fundamental physics of vacuum electron sources," Reports on Progress in Physics, vol. 69, pp. 181-232 (2006).
Zharin, Anatoly L. et al., "Application of the contact potential difference technique for on-line rubbing surface monitoring (review)," Tribology Letters, vol. 4, pp. 205-213 (1998).
Zhu Moxuan, "Experimental Measurements of Thermoelectric Phenomena in Nanoparticle Liquid Suspensions (Nanofluids)," Graduate Thesis, Arizona State University, Dec. 2010.
Go, David B., et al., "Thermionic Energy Conversion in the Twenty-first Century: Advances and Opportunities for Space and Terrestrial Applications", Frontiers in Mechanical Engineering, vol. 3, Article 13, Nov. 8, 2017.
List of Birmingham Technologies, Inc. Patents or Applications Treated as Related, May 2020.
International Search Report for PCT/US2020/019230, dated Jun. 2020.
International Search Report for PCT/US2020/019232, dated Jun. 2020.
Office Action for U.S. Appl. No. 16/284,967, dated Jul. 2020.
International Search Report for PCT/US2020/033528, dated Aug. 2020.

* cited by examiner

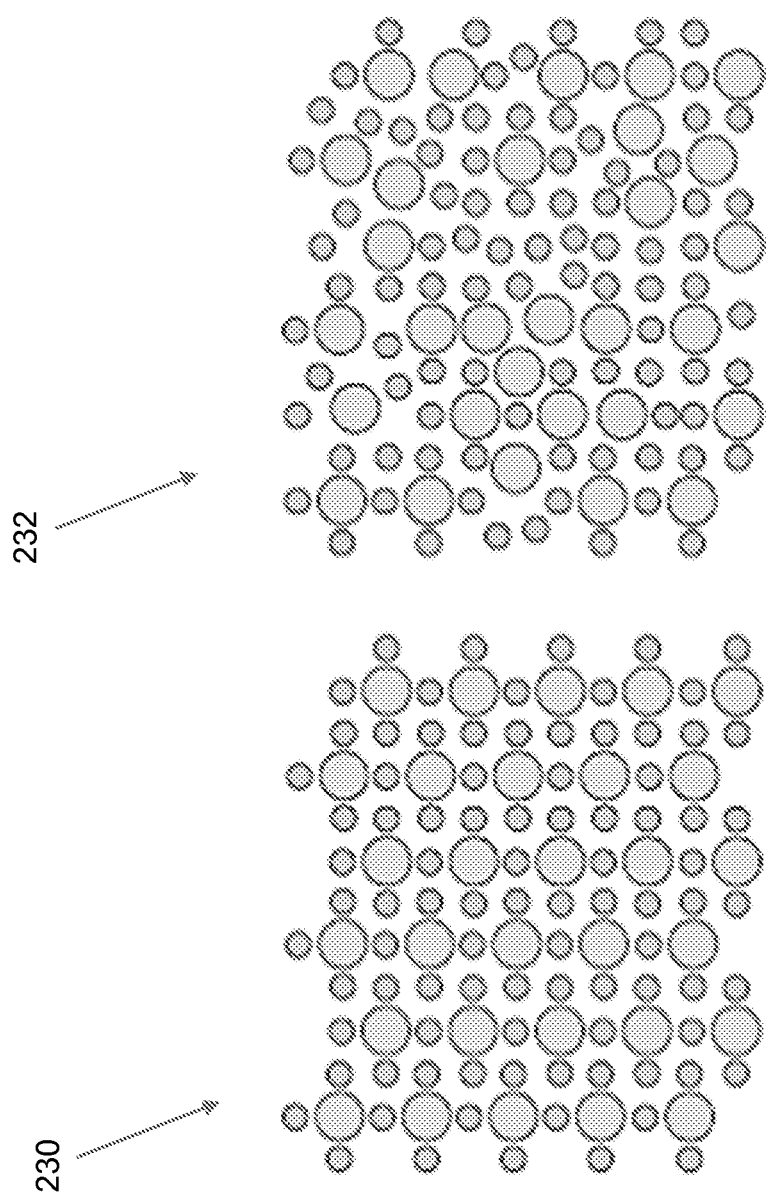

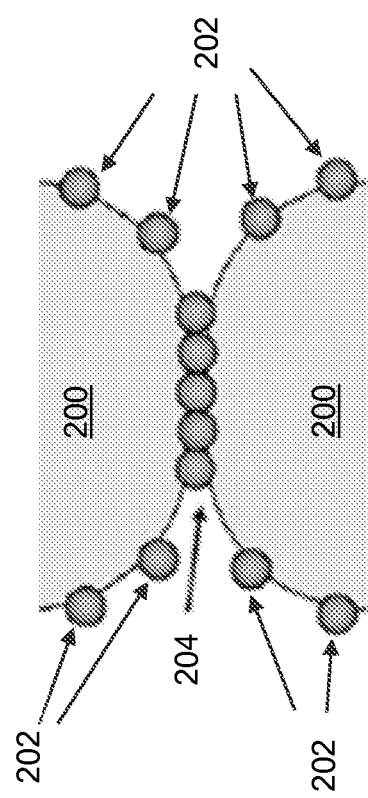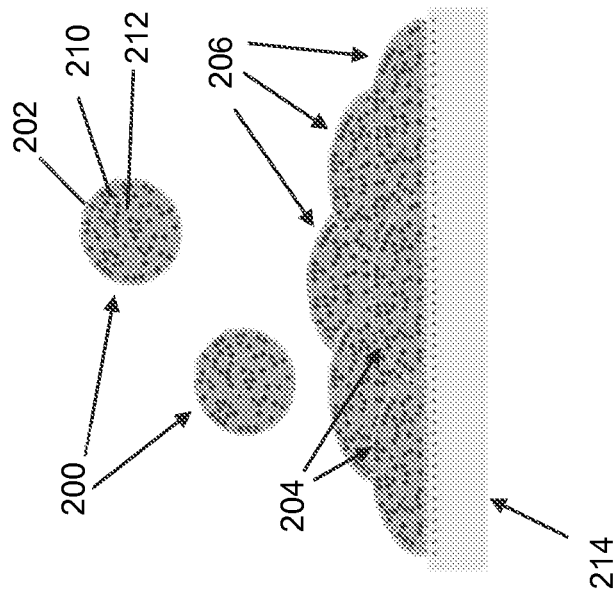
FIG. 10A
FIG. 10B

ELECTROSPRAY PINNING OF NANOGRAINED DEPOSITIONS

CROSS-REFERENCE TO RELATED APPLICATION

The present application claims the benefit of, and priority to, U.S. Provisional Application No. 61/824,909 filed on 17 May 2013, incorporated herein by reference.

FIELD OF THE INVENTION

The present invention relates to devices and methods for using electrospray techniques to directly synthesize nanostructured materials. In particular, this invention relates to the electrospraying techniques that provide for inclusion of grain growth inhibitors and/or alloy additions into nanostructures.

BACKGROUND

Background of Electrospray Process

Electrostatic atomization, also known as electrospray, usually refers to the atomization of a liquid through the Coulombic interaction of charges and the applied electric field. Electrostatic atomization offers several advantages over alternative atomization techniques. Electrospray droplet streams are mainly due to the net charge on the surface of the droplets that is generated and the coulombic repulsion of the droplets. This net charge causes the droplets to disperse, preventing their coalescence. Also, the trajectory of a charged droplet can be guided by an electrostatic field. Another advantage of this type of atomization is the ability to control the size distribution of the spray and under specific electrodynamic operating conditions, obtain a monodispersed spray. Because of these advantages, a wide number of applications exist where electrodynamic atomization can be used. A few of these electrospray applications include spray painting, drug inhalation therapy, and ink jet printing (Bailey, 1988, Hines 1966, Tang 1994).

Electrospray can be described by three different processes. The first process is the formation of the liquid meniscus at a capillary tip (Smith, 1986) which results from a number of forces acting on the interface, including surface tension, gravitational, electrostatics, inertial, and viscous forces. Sir Geoffrey Taylor was the first to calculate analytically a conical shape for the meniscus through the balance of surface tension and electrical normal stress forces which we now know is called the 'Taylor cone' in electrospray and appears in the cone-jet mode (Taylor, 1964).

The cone-jet mode is one of the most widely studied and used modes of electrospray. In the cone-jet mode, liquid leaves the capillary in the form of an axisymmetric cone with a thin jet emitted from its apex. The small jet of liquid issuing out of the nozzle is electrostatically charged when subjected to an intense electric field at the tip of the capillary nozzle (Birmingham, et al., 2001). The droplets are approximately 10 micron in diameter. The charged droplets are propelled away from the nozzle by the Coulomb force and are dispersed out as a result of charge on the droplets.

The Problem—Sintering Destroys Nano-Characteristics

Various methods for producing nanostructured powder materials have been developed. Nano-powder fabrication methods include inert gas condensation, laser vaporization, spark erosion, electro-explosion of wires, microwave plasma, and other methods. Although numerous technologies are available for making nano-sized ceramic powders, obtaining true nano-crystalline ceramic (average grain size <100 nm) has been a great challenge due to the difficulties of controlling grain growth during sintering. Thus, the use of conventional methods of powder consolidation often results in grain growth due to the high temperatures and long sintering duration times. The nanostructure is lost during the sintering process.

Ceramic parts are currently made with micron-size (1.0 to 100 μm) powders that are consolidated and subsequently sintered into parts. Powder consolidation, however, has been largely unsuccessful in producing nano-ceramic parts. One problem in consolidating nano-powders is the inherent low grain density in these high surface area materials, which in turn leads to high linear shrinkage. Current nano-powder compaction techniques produce parts of 40-60% theoretical density, which require sintering at high temperature and long times in order to achieve full density. Significant grain growth during sintering occurs and the benefit of nano-size powders is lost. The heat and pressure applied during the powder consolidation also promotes grain growth, which makes materials lose their desired nano-characteristics. Other problems with powder consolidation methods include high cost, contamination, and porosity.

Use of Nanostructured Materials

Nanostructures produced of metals, ceramics, cermets, inter-metallics, and composites arise from the control of cooling rates to arrest grain growth and retain the nano-crystalline structure during rapid solidification. The grain growth precipitates minimize grain growth due to the difficult diffusion path for atoms across the grain boundaries. For example, the inclusion of grain inhibitors, (such as boron nitride (BN) in the tungsten-carbide/cobalt (WC/Co) fosters cluster stabilization in the cobalt-rich melt by the presence of a high concentration of metal/non-metal binding pairs), that pins the nano-grain structure. The cluster stabilization is increased with the addition of BN because the melt which is already rich in tungsten and carbon would become further enriched in boron and nitrogen.

A major drawback of the above-described nanostructured materials, and in particular nanostructured WC/Co, is the tendency of the produced materials to undergo grain growth during sintering. For example, the as-synthesized nanostructured WC/Co have diameters about 30 nm. However, during sintering, the tungsten carbide grains grow rapidly to diameters of several microns within a few minutes. Vanadium carbide, for example, has been employed by Nanodyne Inc. (Brunswick, N.J.) to prevent this disadvantageous grain growth. The use of vanadium carbide limits the grain growth to around 1 micron and creates sintering difficulties while creating inhomogeneous properties.

Others have incorporated BN nanostructured particles into a germanium crystal lattice to significantly reduce thermal conductivity. Using such methods, micron-sized BN and Si/Ge powders are blended together and evaporated using a plasma torch to form mixtures, which are then condensed into a composite of BN/Si/Ge [Scoville, 1994]. Boron nitride has also been incorporated into a conventional (larger than 100 nm) titanium diboride system with WC/Co additives where BN is incorporated in the form of a powder. The use of BN as a grain growth inhibitor still produces large micron-sized grains [Mehrotra, 1997].

Accordingly, there remains a need in the art for methods of inhibiting grain growth during the processing of as-synthesized nanostructured materials and intermediates, especially a method and apparatus applicable to a wide range of applications.

DESCRIPTION OF RELATED ART

For decades, materials with fine-scale micro- and nano-structures have been recognized to exhibit unusual and technologically-desired properties. Currently, interest is growing in a new class of materials that are composed of very fine grains or particles having dimensions in the range of 1-100 nanometers (nm), known as nanostructured materials.

Numerous techniques have demonstrated significant progress in the production of nanostructured materials: for example, the production of nanostructured metal powders by the organic solution reaction (OSR) method and the aqueous solution reaction (ASR) method [Xiao 1996, Strutt 1993]. The OSR and ASR methods employ a step-wise process employing the reaction of materials via spray atomization to produce a nanostructured precipitate. The precipitate is often heat-treated and further nitrided or carburized to obtain the desired nanostructures.

Another approach to the synthesis of nanostructured materials is the inert gas condensation (IGC) method [Seigel 1996]. The IGC method uses evaporative sources of metals, which are then convectively transported and collected on a cold surface. Ceramic materials must be obtained by initially vaporizing the metal source, followed by a slow oxidation process. One problem with this method is the production of loosely agglomerated nanostructured powders.

One other method for the synthesis of nanostructured materials is chemical vapor condensation (CVC). CVC substitutes the evaporative source and replaces it with a hot-wall tubular reactor that decomposes a carrier gas to form a continuous stream of clusters of nanoparticles exiting the reactor tube. These clusters are then rapidly expanded into the main reaction chamber, and collected on a liquid nitrogen cooled substrate [Kear 1990]. Furthermore, he describes the thermal (100-300° C.) spray-drying of aqueous solutions containing tungsten and cobalt that forms spherical hollow shell amorphous tungsten oxide and cobalt. Nano-structured WC-Co is then obtained by the carburization of this material at 800-900° C. in a carbon-containing gas mixture [McCandlish, et. al, 1993].

Xiao, et. al. (U.S. Pat. No. 6,287,714 Sep. 11, 2001) focuses on metal alloys and grain growth inhibitors and lacks the ability to control the microstructure and morphology of the nanostructure because of the reliance on diffusion-bonding processes. The benefits of inter-grain bonding found in charged electrospray droplets are unavailable in this invention.

Several groups taught that electrosprays could be used to deposit films for semiconductors. For example, Meagley (U.S. Pat. No. 7,259,109 Aug. 21, 2007) is depositing films without the monodispersity, positioning, and other conditions necessary to form printable nanostructures. Schlaf (U.S. Pat. No. 7,906,182, Mar. 15, 2011) focuses on polymer depositions with similar limitations as Meagley. Similarly, electrospray devices could be used to create nanoparticles or nano-powders. For example, John F. Mahoney et. al. (U.S. Pat. No. 4,264,641—Apr. 28, 1981 and U.S. Pat. No. 4,762,975—Aug. 9, 1988) produced nanostructured powders but does not teach a pathway to bulk nanostructured fabrication. An attempt at directly producing nanostructures was pursued by Jacobson et. al. (U.S. Pat. No. 7,651,926, Jan. 26, 2010 and U.S. Pat. No. 8,367,525, Feb. 5, 2013). They taught that the electrospray deposition required a charge pattern on the substrate along with a multi-stack focusing lens or deflectors (in concert with a separate extraction electrode) was needed for positioning nanostructures. Sintering was needed to create cohesive structures. Later, Jacobson, et. al (U.S. Pat. No. 8,093,144, Jan. 10, 2012) describes the charging of the substrate with the deposition of alternately charged species to create structures. The magnetic fields used for charge trajectory control are focused along an axis parallel to the plane of the substrate. The nanostructure characteristics and their inherent benefits are lost during sintering.

Many groups have taught that spray-forming of 3-D particles has many manufacturing advantages. For example, Sterett, et. al. (U.S. Pat. No. 5,960,853 Oct. 5, 1999) described the molten material spray deposition process without a pathway to a nonporous nanostructured material. The pathway to rapid particle production is the use of multiple electrospray nozzles.

SUMMARY

The drawbacks and deficiencies of the prior art are overcome or alleviated by the method and apparatus of the exemplary embodiments, comprising incorporation of a grain growth inhibitor (nano-grain pinning compound) into nanostructured materials or precursors of nanostructured materials along with a wetting agent (binding agent). The wetting agent and the nano-grain pinning compound could be the same material, but with the wetting agent in a liquid phase and the nano-grain pinning compound in a solid particulate phase.

The exemplary embodiments include a method for fabrication of objects retaining nano-scale characteristics. The method starts with providing a composition of grain growth inhibitor particles in solution with a binding agent in a molten liquid phase. Then, an electric field and a magnetic field are generated with a combined extraction electrode. Then the composition is extracted from a nozzle with the electric field to form a stream of droplets of nanoparticle size. The electric field is configured for driving the droplets toward a moving stage holding an object comprising successive deposition layers. The magnetic field is configured for limiting dispersion of the stream of droplets during travel of the droplets from the nozzle to the moving stage. The moving stage is moved laterally with respect to the nozzle as the stream of droplets impacts the object to form a current deposition layer of the object. The moving stage is moved vertically with respect to the nozzle as necessary to maintain a target stand-off distance between the nozzle and a previous deposition layer of the object, based on profile data of the previous deposition layer.

The control of the temperature of the droplet is paramount to achieving the desired nanostructures. Also, the precursor/nanostructured material composite is optionally heat-treated to relieve stress at a temperature below the grain growth temperature of the nanostructured material. The electrospray deposition of monodispersed micron-sized or nanodroplets enables the uniform distribution of grain growth pinning agents throughout the nanostructured materials.

In the exemplary embodiments, alloying additives and/or grain growth inhibitors are incorporated into the nanostructured materials. The alloying additives and/or grain growth inhibitors may be incorporated into the nanostructured materials.

An especially advantageous feature of the described method is its applicability to a wide variety of material systems, including metals, ceramics, metal alloys, carbides, nitrides, inter-metallics, ceramics, and their combinations. Preferably, the grain growth inhibitor itself is a high performance material, exhibiting excellent mechanical and other physical and chemical properties. Addition of alloying agents further improves the properties of the nanostructured materials, including hardness, toughness, density, corrosion- and erosion-resistance. The described method allows the economical, large-scale, fabrication of high performance nanostructured materials having a wide range of applications for targeted applications.

BRIEF DESCRIPTION OF THE DRAWINGS

The present invention is described by way of exemplary embodiments, but not limitations, illustrated in the accompanying drawings in which like references denote similar elements, and in which:

The accompanying drawings, which are incorporated into and constitute a part of this specification, illustrate one or more embodiments of the invention and, together with the detailed description, serve to explain the principles and implementations of the invention.

FIG. 4A shows the ordered structure of ceramics.

FIG. 4B showing the non-ordered structure of metal alloys.

FIGS. 10A and 10B show the formation of bridging monolayers in droplets.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of various implementations, numerous implementation-specific decisions must be made in order to achieve the developer's specific goals, such as compliance with application and business related constraints, and that these specific goals vary from one implementation to another and from one developer to another. Moreover, it will be appreciated that such a developments effort may be complex and time-consuming, but are nevertheless routine undertakings of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

Those skilled in the art recognize that numerous modifications and changes may be made to the exemplary embodiments without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

Exemplary Electrospray Apparatus

Figure 1:
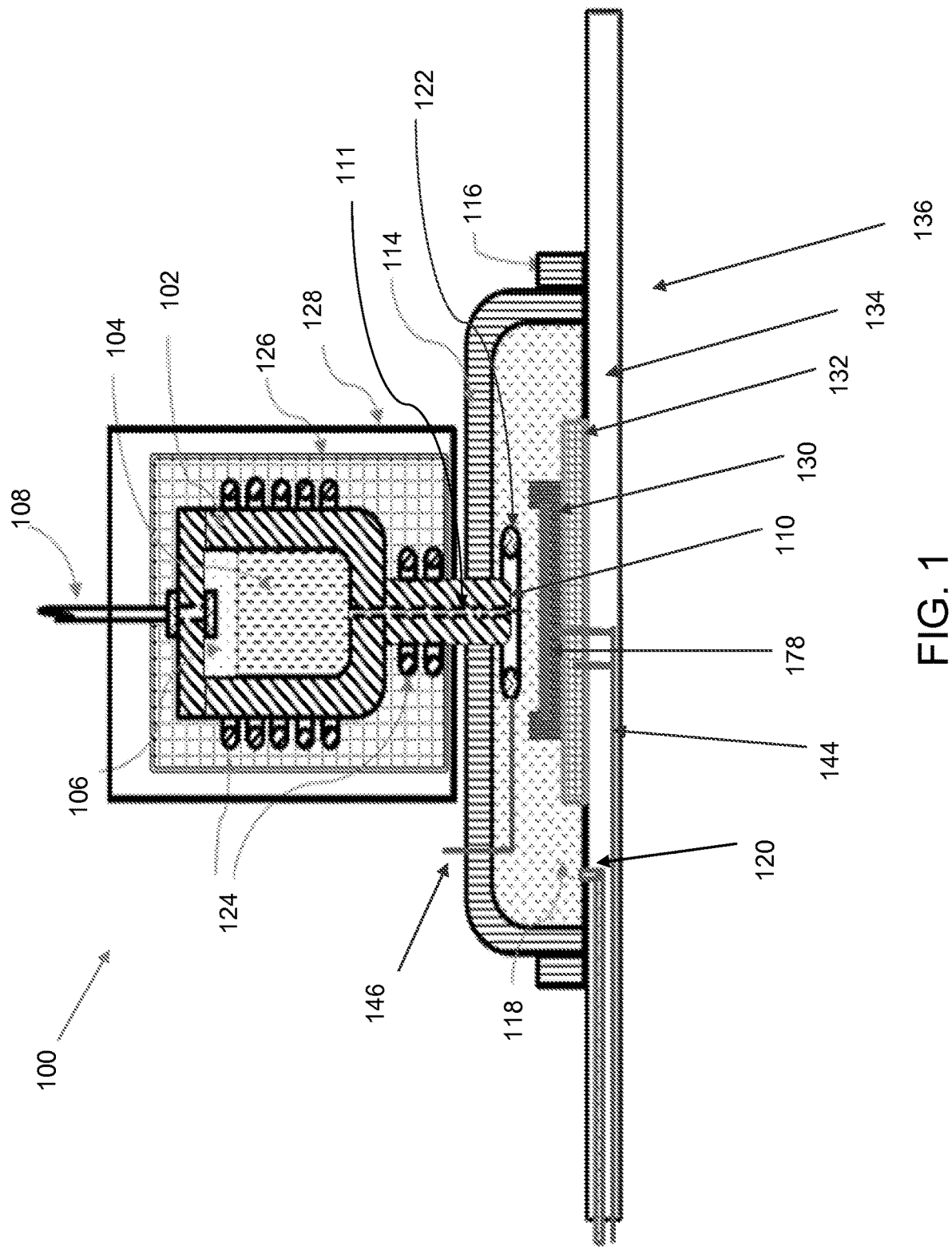
FIG. 1 shows the major components of an electrospray apparatus in accordance with an exemplary embodiment.
Figure 6:
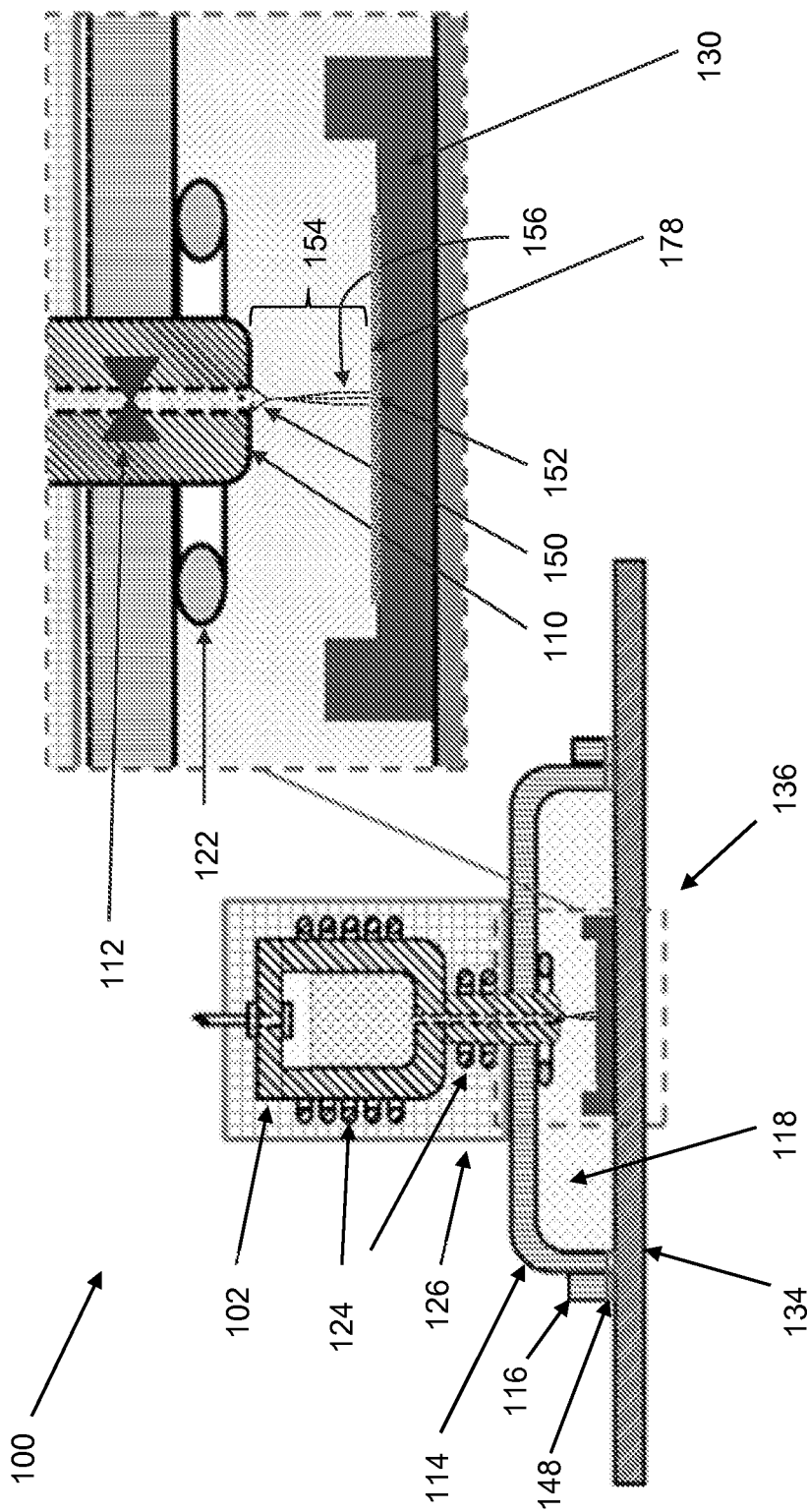
FIG. 6 shows an expanded view of the area around the electrospray nozzle and object holder in the exemplary embodiment of the electrospray apparatus.

FIGS. 1 and 6 show the major components of an electrospray apparatus 100 in accordance with an exemplary embodiment. The electrospray apparatus 100 has material reservoir 102 for holding a molten material 104. A reservoir gas 106 occupies a space in the material reservoir 102 above the molten material 104. A reservoir inlet 108 enters the top of the material reservoir 102 to supply addition gas as needed, preventing vacuum lock and reduced flow out of the material reservoir 102. Induction heating coils 124 wrap around the material reservoir 102, serving to heat and stir the molten material 104. A faraday cage 126 around the material reservoir 102 and ancillary components shields the environment from electromagnetic radiation produced by the induction heating coil 124. A vented heat shield 128 performs a similar function regarding the heat produced by the induction heating coil 124.

An electrospray nozzle 110 is coupled to the bottom of the material reservoir 102 with a capillary tube 111 therein configured for transporting the molten material 104 out of the material reservoir 102. In some embodiments, the electrospray apparatus 100 may have more than one electrospray nozzle 110.

An extractor electrode 122 is coupled to the electrospray nozzle 110, positioned near the bottom of the electrospray nozzle 110 where the capillary tube 111 exits. The extractor electrode 122 is configured for generating an electrical field. The electric field it generates extracts the molten material 104 from the electrospray nozzle 110 to form a stream of droplets of nanoparticle size. The electric field also drives the droplets to a moving stage 136. The extractor electrode 122 can also generate a magnetic field. The magnetic field generated can serve for limiting dispersion of the stream of droplets. The electrosprayed droplets are charged, which tend to disperse the droplets from one another. Charged particles moving across magnetic field lines experience a force that is orthogonal to both the magnetic field lines and the motion of the charged particles. If the magnetic field is strong relative to the velocity of the charged particle, the charge particles tend to orbit magnetic field lines while moving along them. Thus the dispersive tendencies of the stream of charged droplets are be countered by the magnetic field. The extractor electrode 122 is shaped to provide both the electric field and magnetic field with characteristics useful for extracting molten material 104 from the electrospray nozzle 110, driving the stream of droplets 156 toward to the moving stage 136, and focusing the stream of droplets 156 on a deposition area 152 on the moving stage 136. In the exemplary embodiment, the extractor electrode 122 has a toroid shape with the center of the toroid penetrated by the electrospray nozzle 110. In some embodiments, the extractor electrode 122 comprises one or more turns of wire, with more turns producing a greater magnetic field for the same amount of current. Extractor electrode wiring 146 provides electrical current to the extractor electrode 122.

The moving stage 136, as previously mentioned, serves as the target for the electrosprayed stream of droplets 156. The moving stage 136 is configured for moving relative to the nozzle in three orthogonal dimensions. The moving stage 136 is typically electrically grounded so that it forms a planar endpoint for the electrical field. In the exemplary embodiment, the moving stage 136 comprises a utility base plate 134, a cooling chuck 132 and an object holder 130. The object holder 130 is configured for holding a fabricated object 178 that results from the electrospray process. Initially, the object holder 130 holds a substrate onto which the electrosprayed stream of droplets 156 deposits. In some cases, no substrate is used and the electrospray deposits directly onto the object holder 130. The cooling chuck 132 is positioned underneath the object holder 130 and coupled thereto. The cooling chuck 132 is configured for cooling the object holder, typically with one or more thermoelectric cooling chips that use DC current to pump heat from the object holder 130 to the utility base plate 134. The utility base plate 134 is exposed to ambient air and may be cooled with natural convection or forced air flow. The utility base plate 134 has wiring 144 for powering the cooling chuck 132 and for any sensors that may be imbedded in the object holder 130. The utility base plate 134 has an enclosure gas inlet 120 to inject gases into the enclosure cavity 118.

The exemplary electrospray apparatus 100 has an enclosure 114 coupled to the electrospray nozzle 110 and material reservoir 102. In the exemplary embodiment, the enclosure 114 is made of quartz, but other suitable materials may be used. The enclosure 114 is shaped such that when placed in contact with the moving stage 136, they define an enclosure cavity 118 that serves as a controlled environment for the electrospraying process. The enclosure 114 has an enclosure floating frame 116 that is slidingly coupled to the outer edges of the central part of the enclosure 114. The enclosure floating frame 116 maintains contact with the moving stage 136 as the moving stage 136 moves vertically over short distances. This keeps the enclosure cavity 118 fully enclosed during electrospray object fabrication. An enclosure gasket 148 on the bottom of the enclosure floating frame 116 improves the seal of the enclosure cavity 118 and allows the moving stage 136 to move laterally without breaking the seal. In the exemplary embodiment, the enclosure gasket 148 is made of felt, but in other embodiments may be made of other suitable materials.

FIG. 6 shows an expanded view of the area around the electrospray nozzle 110 and object holder 130 in the exemplary embodiment of the electrospray apparatus 100. Some details are not shown in FIG. 6 to more clearly present other details. In the exemplary embodiment, the electrospray nozzle 110 has a nozzle valve 112 to control the flow rate of molten material 104 through the nozzle. Other embodiments may omit the nozzle valve 112 and control the flow rate of the molten material 104 in other ways, such as changing the pressure of the reservoir gas 106 in the material reservoir 102 or changing the electrical conditions of the extractor electrode 122.

The electrosprayed stream of droplets 156 emerges from a Taylor cone 150 that forms on the tip of the electrospray nozzle 110 when the electric field draws the molten material 104 out of the capillary tube 111. Dispersion of the stream of droplets 156 is limited by the magnetic field. A region on the fabricated object 178 where the stream of droplets 156 impacts is referred to as the deposition area 152. The fabricated object 178 comprises successive deposition layers. The moving stage 136 moves laterally while the stream of droplets 156 impacts on the fabricated object 178, forming the current deposition layer over previous deposition layers. The distance between the electrospray apparatus 100 and the fabricated object 178 is referred to as the stand-off distance 154 or distance-to-deposition. The stand-off distance 154 changes as the stream of droplets 156 impacts on the fabricated object 178, adding deposited material. On the next pass, creating the next deposition layer, the stand-off distance 154 would be reduced, if no other action is taken. For reasons explained elsewhere herein, it is important to maintain the stand-off distance 154 at or near a target stand-off distance. This can be achieved by adjusting the moving stage 136 vertically as necessary.

Figure 7:
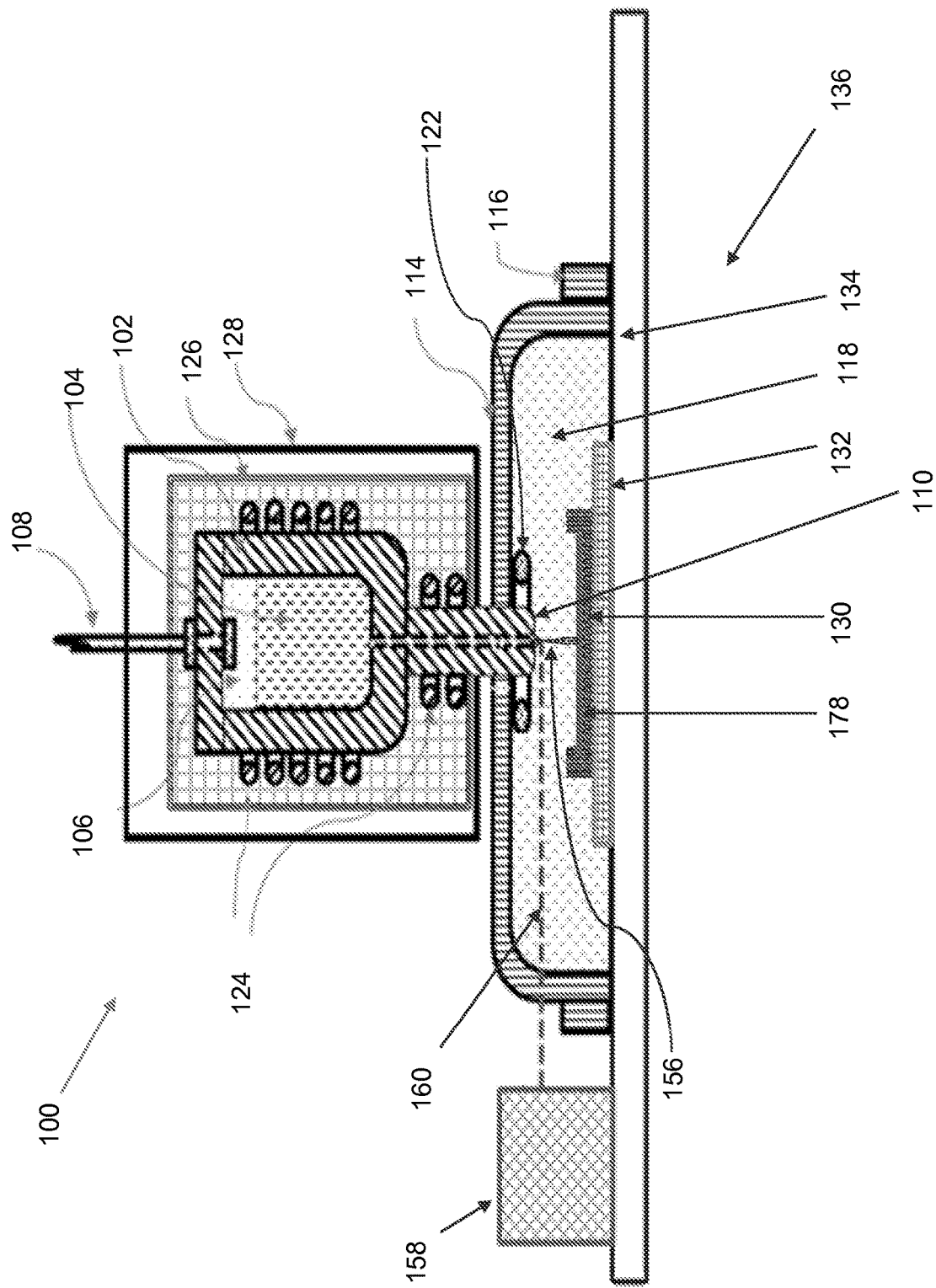
FIG. 7 shows the exemplary electrospray apparatus with a heater for adding thermal energy to the stream of droplets.

FIG. 7 shows the exemplary electrospray apparatus 100 with a heater 158 for adding thermal energy to the stream of droplets 156. In some embodiments, the heater 158 is used to add thermal energy to the stream of droplet 156 when they cool off too much before impact with the fabricated object 178. As explained in more detail elsewhere herein, the properties of the fabricated object 178 may be adversely affected if the droplets impact when they are too cool. In the exemplary embodiment, the heater 158 is a radiation source that supplies thermal energy to the stream of droplets 156 with a radiation beam 160. More specifically, the heater 158 is an infrared laser, but in other embodiments may emit radiation at other parts of the spectrum than infrared and may not be a laser. In the exemplary embodiment, the heater 158 is mounted outside the enclosure 114 and the radiation beam 160 passes through the enclosure 114, which in the exemplary embodiment is made of quartz. In some embodiments, the heater 158 is coupled to the utility base plate 134 of the moving stage 136. This mounting may require aiming control for the radiation beam 160, as the moving stage 136 moves relative to the electrospray nozzle 110 and hence the stream of droplets 156. Alternatively, the heater 158 may be coupled to the enclosure 114 or to the electrospray nozzle 110.

Figure 9:
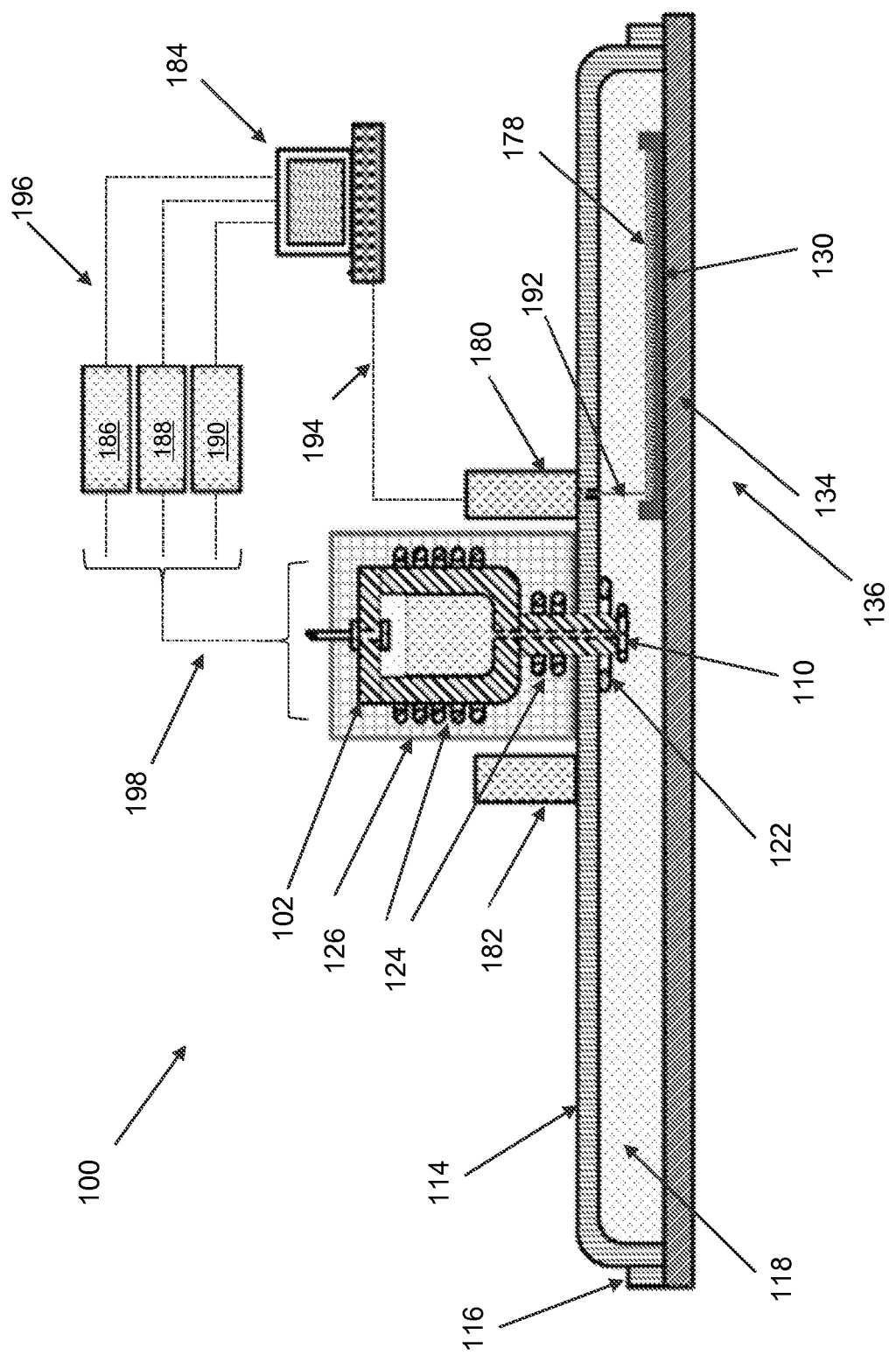
FIG. 9 shows the exemplary electrospray apparatus with two profilometers and a control system.

FIG. 9 shows the exemplary electrospray apparatus 100 with two profilometers and a control system. The first optical profilometer 180 is configured for measuring the distance to the fabricated object 178. As the moving stage 136 moves the fabricated object 178 under the first optical profilometer 180, the profilometer measures the distance to the fabricated object 178 at specific time intervals, creating profile data about the fabricated object 178, or more specifically, about the current deposited layer of the fabricated object 178. This profile data is sent to a main control unit 184 via a profilometer communication link 194, which may be wired or wireless. The exemplary embodiment has a second optical profilometer 182, but other embodiments may have more or fewer profilometers.

The main control unit 184 uses the profile data to control the electrospray apparatus 100 during deposition of the next deposition layer. For deposition of the next deposition layer, the main control unit 184 has the moving stage 136 move vertically as necessary to maintain the stand-off distance 154 at the target stand-off distance, based on the profile data of the proceeding deposition layer.

The main control unit 184 also uses the profile data to compensate for errors in the previous deposition layers. If the profile data of the proceeding deposition layer indicates that some region of the fabricated object 178 is too thick, the main control unit 184 can correct on the next deposition layer by slowing the flow rate of molten material 104 through the electrospray nozzle 110 when over that region. Likewise, if the profile data of the proceeding deposition layer indicates that some region of the fabricated object 178 is too thin, the main control unit 184 can correct on the next deposition layer by increasing the flow rate of molten material 104 through the electrospray nozzle 110 when over that region. The main control unit 184 controls the flow rate of the molten material 104 using the nozzle valve 112 or in other ways, such as changing the pressure of the reservoir gas 106 in the material reservoir 102 or changing the electrical conditions of the extractor electrode 122.

The main control unit 184 is connected by main control unit communication links 196 to one or more sub-control units. The exemplary embodiment has a first sub-control unit 186 for controlling the moving stage 136, a second sub-control unit 188 for controlling the extractor electrode 122, and a third sub-control unit 190 for controlling the heater 158. Other embodiments may have more or fewer sub-control units, depending on the components they have.

Multi-Nozzle Electrospray Apparatus

Figure 8:
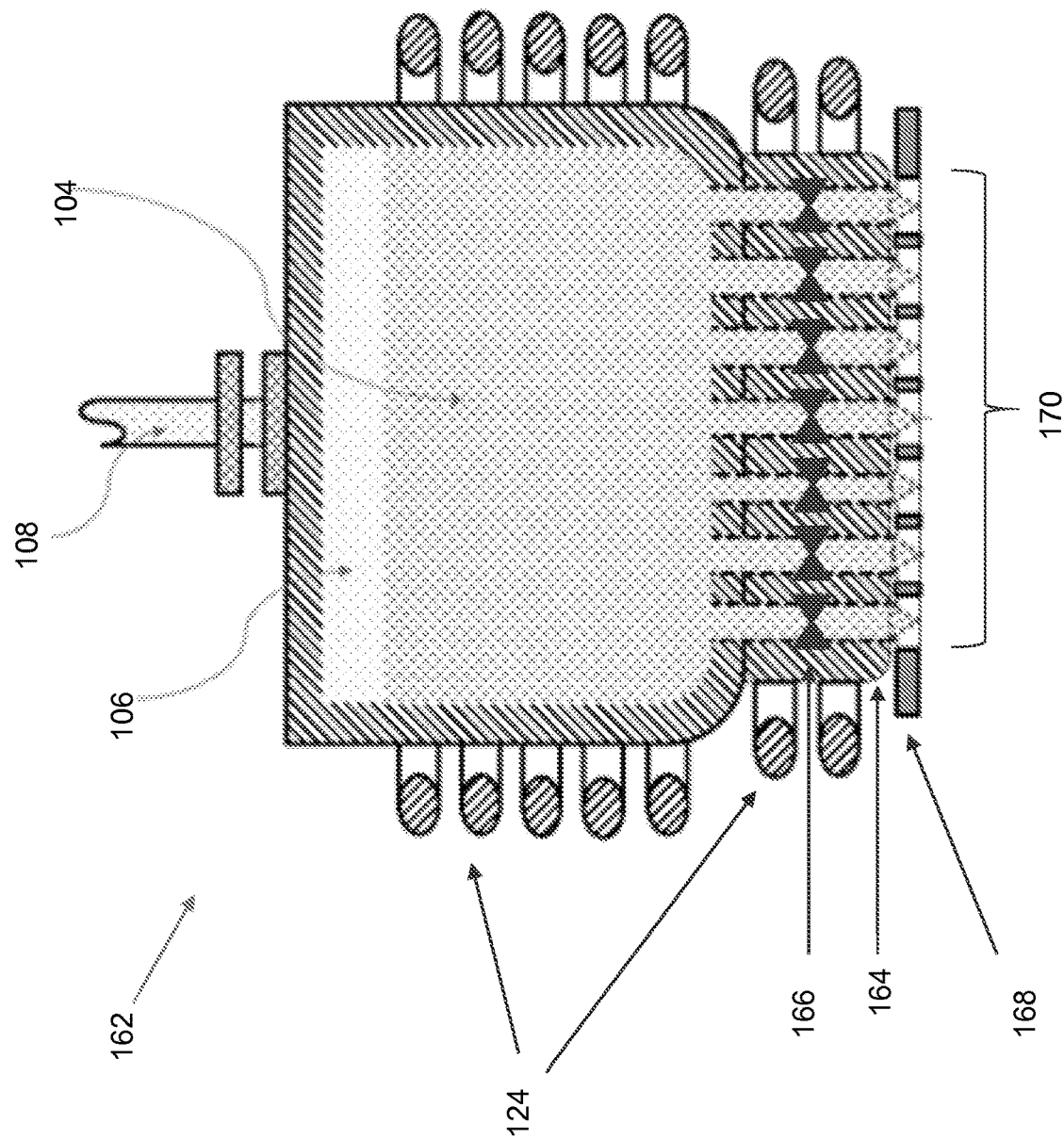
FIG. 8 shows a multi-nozzle reservoir.

In order to achieve reasonable production rates, multiple electrospray nozzles producing larger droplets can be used. FIG. 8 illustrates an example of a multi-nozzle reservoir 162. The multi-nozzle reservoir 162 has many of the same components as the single nozzle material reservoir 102 of FIG. 1, such as the induction heating coils 124 and the reservoir inlet 108. Instead of a single nozzle, the multi-nozzle reservoir 162 has an array of nozzles 164. In some embodiments, the multi-nozzle reservoir 162 has an array of nozzle valves 166 to control flow of the molten material 104 through the array of nozzles 164. An extractor electrode plate 168 with multiple openings is configured to extract an array of electrospray streams 170.

Formation of Bridging Monolayers

As the droplets 200 in the stream of droplets 156 travel from the electrospray nozzle 110 to the fabricated object 178 on the moving stage 136, grain growth inhibitor particles 202 migrate to the surface boundaries of the droplets 200 (See FIGS. 10*a* and 10*b*). The droplets 200 in this example are comprised of first type binder agent particles 210, second type binder agent particles 212 and grain growth inhibitor particles 202, though in other embodiments may comprise other particle types. When the droplets 200 impact on the substrate 214 and turn into a splat 206, grain growth inhibitor particles 202 form bridging monolayers 204. The bridging monolayers 204 limit grain growth of the other particles to within the splat 206. This preserves the nano-characteristics of the fabricated object 178.

Grain Growth Inhibiting Materials

Figure 2:
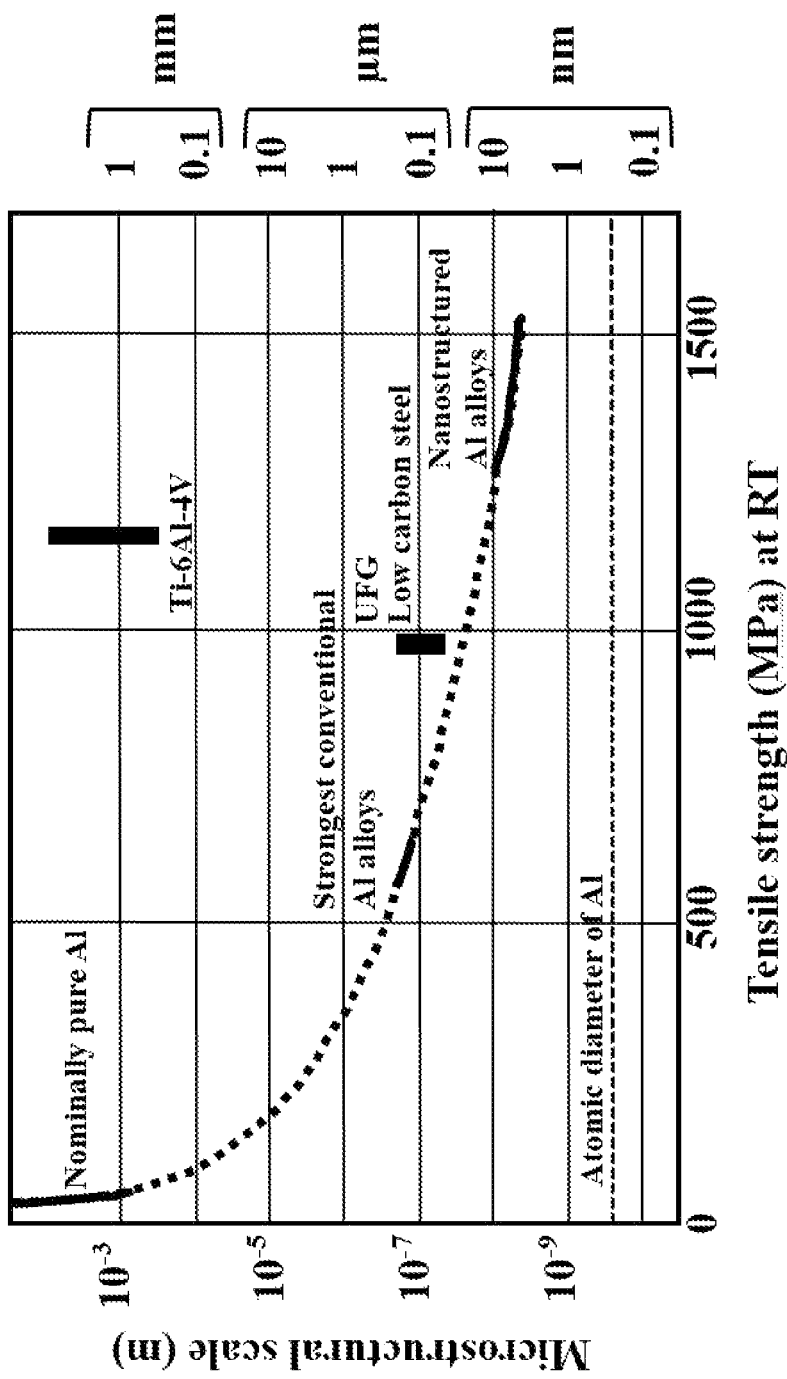
FIG. 2 is graph of Tensile Strength as a Function of Grain Size.

Bulk nanostructured materials are defined as solids with nanoscale (typically 1-100 nm) substructures. Nanostructured materials with average grain sizes of less than 20 nm have demonstrated order-of-magnitude increases in mechanical properties (when compared to their coarse-grained counterparts) including high strength and elongation to failure. These mechanical properties include an extraordinary combination of both high strength and ductility—two desirable, but rarely co-existing properties. As shown in FIG. 2, these superior mechanical and physical properties make nanostructured materials attractive for numerous applications with a need for high strength-to-weight ratio and ductility for "light-weighting" existing structural elements (e.g. replacing heavier components in vehicles, aviation platforms, containers, etc.).

The common technique to control the nano-grain size of a material is by the addition of impurities, which leads to the formation of second phase particles [Perepezko, 2002; Vanherpe, 2010]. These alloying/composite impurities such as the selection of interfacial reducing solutes (e.g. zirconia and scandium) along with particles (e.g. silicon carbide or alumina) inhibit grain boundary movement during grain growth, thereby stabilizing the nanostructure. The novel aspect of the approach described herein is the ability to directly electrospray the desired composition of the (e.g. aluminum) alloy during processing to achieve the desired final properties by material additions (including particles and selected solutes). These material additions are deposition bonded by electrospray and distributed within the alloy (e.g. Al) to produce the desired properties in the final articles.

One problem encounter using known methods—such as severe plastic deformation (SPD)—with grain sizes below 20 nm is that grain growth occurs at low temperatures. Therefore, nanomaterial additions to the example metal (e.g. Al) must include both solute (typically elements from transition metals (TM) and rare earth (RE) materials) and nanoparticles (such as alumina and silicon carbide) that are added to stabilize the nano-grained metal to prevent grain growth. Aluminum subjected to SPD experiences hardening by annealing and softening by deformation—behavior is contrary to coarse-grained aluminum. Normally, one softens a metal by heating (or annealing) and hardens by cold-working. This contrary behavior was explained by the correlation between the strength and the density of dislocations in the nanostructured metals. When the annealing of this nanostructured aluminum alloy is heated below the recrystallization temperature and no grain growth occurs, the free dislocations and dislocation sources are annealed out resulting in hardening. This hardening occurs during the stress-relieving of the nano-metal alloy layers. With a reduction of the grain size, there are more grain boundaries which are effective dislocation barriers resulting in harder material.

The addition of precipitating materials such as solutes and particles stabilize the nano-grain structure resulting in the tailored properties. For example, the precipitation of solutes such as zirconia and scandium form thermally stable solutes that effectively prevents recrystallization due to the pinning effect of thermally stable precipitates up to high temperatures. The effect of these thermally stable precipitates on the annealing of the aluminum alloy at 330° C. produces additional strengthening and thermal stability. This result suggests that the hardness increase introduced by exemplary electrospray process is due to the dissolution of the precipitates during deposition. Similarly, the precipitation of particles such as silicon carbide can increase the hardness as well as stabilize the nano-grain structure.

Any successful utilization of nanostructured materials depend upon the subsequent thermal stability of the nanostructures produced that are in a metastable condition. Relaxation in nano-grains may occur at significantly lower temperatures than in coarse-grained materials. Grain growth begins in nanostructured materials at relatively low temperature (0.4 $T_m$ where $T_m$ is the melting temperature). To induce the lowering of the grain boundary energy and stabilize the grain size against coarsening, the atomic radius of the alloying materials should be much larger or smaller than the atomic radius of nanomaterial. The enhanced content of the alloying material elements contributes to the decreasing of the grain boundary. For example, the selection of materials such as zirconia and scandium and other solutes to stabilize the grain boundaries (due to interfacial energy decrease) at concentrations around 4% in the aluminum material result in a stabilized material. Any material can be electrosprayed to create a nanostructured alloy/composite with the nanomaterial that were subsequently made into a stable nanostructure by the addition of solutes and particles. The use of this interfacial energy reduction approach allows for increasing the stability of nanostructures in the nanomaterial (Al) up to 0.8 $T_m$ where $T_m$ is the melting temperature. Besides the solute addition, one can add ductile nano-grained particles to the nano-grained alloy to thermally stabilize the tailored properties of the final nanostructured material.

Exemplary Combinations of Solutes

Figure 3B:
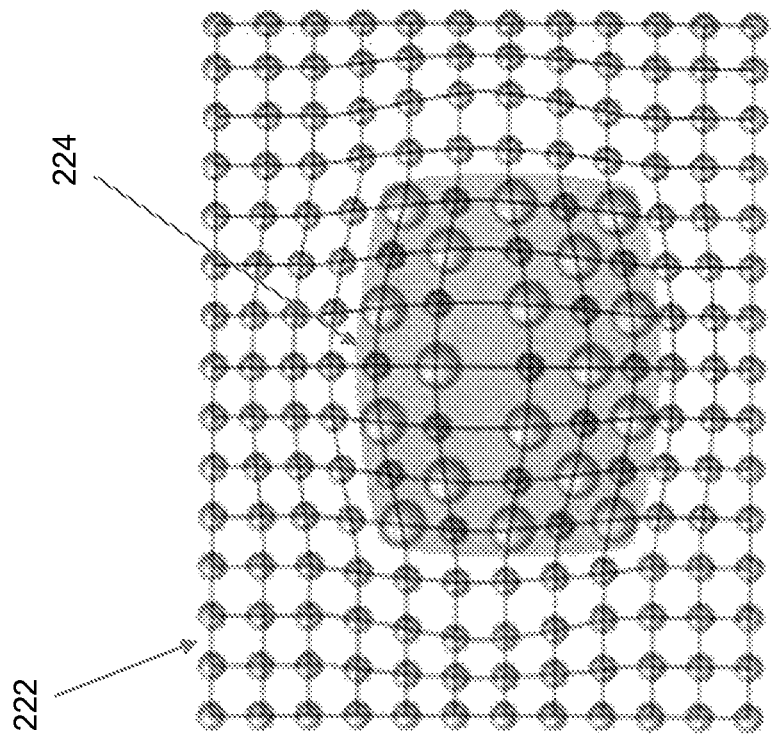
FIG. 3B shows a solute inclusion in a lattice.
Figure 3A:
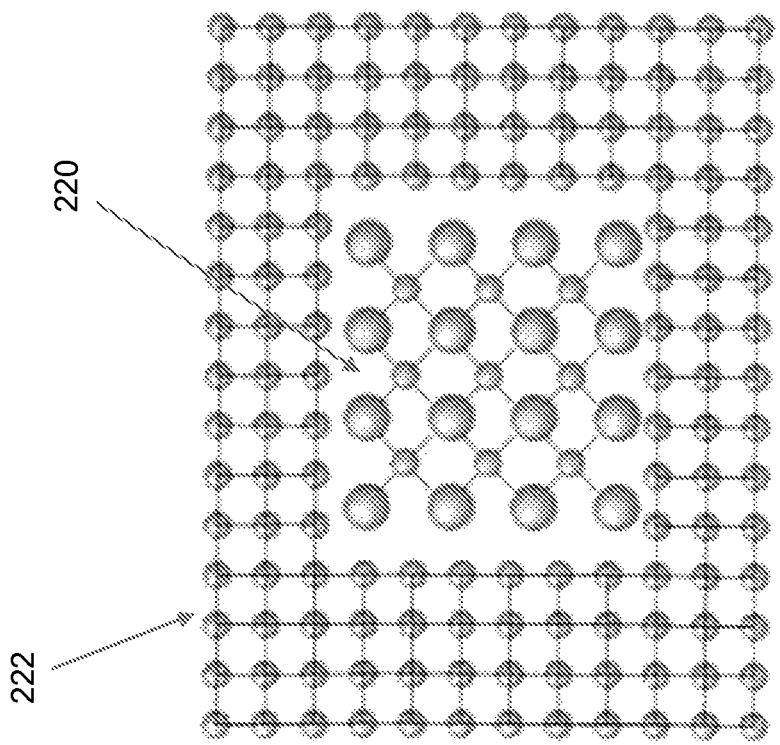
FIG. 3A shows a particle inclusion in a lattice.

One innovation of the exemplary electrospray process is the combination of solutes or particles that are incorporated in the electrosprayed nano-sized droplets to be blended into the final nanostructure (assuming the incorporation of a wetting agent/binder and a nano-grain pinning compound). As shown in FIGS. 3a and 3b, a precipitate's interaction with the crystal lattice is important. As found in FIG. 3a, particle inclusion in the lattice refers to a non-coherent precipitate 220 with no relationship to the crystal lattice 222 and FIG. 3b illustrates that solute inclusion 224 in the schematic refers to a coherent precipitate with a relationship to the crystal lattice 222. The exemplary electrospray process described herein has a capability for combining normally un-alloyable compounds, solutes or particles (to be incorporated in the electrosprayed nano-aggregates) are blended into the final nanostructure (assuming the incorporation of a suitable wetting agent/binder and a nano-grain pinning compound). Several examples follow.

In a first example, these aluminum alloys show strengths of more than 1,200 MPa with a good ductility of more than 5%. The elastic modulus of the nano-metal could reach values up to 220 GPa compared with coarse-grained aluminum alloys that have an elastic modulus of 70-80 GPa. The elements of Si, Fe, Cu, Mn, and Mg in Al-alloys are known to increase tensile properties by forming precipitates such as $Al_2Cu$, $FeAl_3$, $Mg_5Al_8$ and $Mg_2Si$ during the deposition process. The elastic modulus could be changed by alloying elements, ceramic particles, and fibers. All particle reinforced aluminum-composites show a higher elastic modulus, a lower coefficient of thermal expansion (CTE), and higher wear-resistance compared to conventional alloys. The exemplary method can add these property-tailoring materials to obtain the desired final mechanical properties. Increased strength, particularly when coupled with stress-relieving heat treatment below the recrystallization temperature with copper, magnesium, manganese, silicon, and zinc is achieved in the nanomaterial. These elements all have significant solid solubility in aluminum, and in all cases, the solubility increases with increasing temperature. Of all the elements, zinc has the highest solid solubility in aluminum (a maximum of 66.4 by wt. %).

Solute—Segregation Example: Scandium: One of the possible first steps to stabilize the nanostructure is the reduction of the grain boundaries mobility by second phase drag and solute drag. As an example, the presence of scandium-bearing particles in model aluminum alloys allow for retaining the enhanced micro-hardness up to temperatures of 300-350° C. The lowering of the specific grain boundary energy by solute segregation to the grain boundaries can be accomplished. It can be achieved by segregation of the alloying elements on the grain boundaries, thereby reducing the elastic strain energy. The addition of small amounts of zirconia and scandium effectively prevents recrystallization due to the pinning effect of thermally stable precipitates up to high temperatures. The effect of these thermally stable $Al_3(Sc_{1-x}Zr_x)$ precipitates on the annealing at 300° C. of the aluminum alloy/composite is expected to produce additional strengthening and thermal stability.

Interfacial energy reduction: Zirconia: Interfacial energy reduction is a superior method to prevent grain growth in nano-crystalline materials, while retaining the desired properties, as compared to methods such as kinetic pinning of grain boundaries by secondary phases. Since grain boundary (GB) mobility follows an Arrhenius behavior, all kinetic pinning processes are temperature dependent and temperature limited. Recently, it was reported [Krill 2005] that the addition of zirconium (Zr) to palladium (Pd) led to an alloy that retained its nano-crystalline microstructure (<100 nm) up to ~1500° C., or 95% of its melting temperature. A large interfacial energy reduction of approximately 70% was cited as the reason for the thermal stability. In particular, the release in elastic enthalpy upon Zr solute segregation to the interfacial boundaries was identified as the actual mechanism responsible for the large energy reduction.

Phase Separation: Silicon and Magnesium: Without solute atoms, low-energy grain boundaries tend to exhibit significantly less sliding than high-energy grain boundary. Simulation results show that elements which tend to phase segregate from Al, such as Si, can enhance grain boundary sliding in high-energy grain boundary by weakening Al bonds and by increasing atomic mobility. In comparison, intermetallic forming elements, such as Mg, form immobile Mg—Al clusters, decrease diffusivity, and inhibit grain boundary sliding. Grain boundary sliding increases ductility on the nanoscale in a nano-grain matrix.

These nanostructures have cell or sub-grain boundaries of the original coarse-grained material. High angle grain boundaries are needed as a substantial percentage of the boundaries to take advantage of the nano-crystalline properties. For example, at a grain size of 100 nm, approximately 3% of all atoms are associated with grain boundaries. As the grain size is reduced to 10 nm, the percentage increases to 30%; at 5 nm, approximately 50% of all atoms are associated with the grain boundary sites. The unique properties of nano-grained materials are associated with the fineness of structure as well as the enhanced solubility and increasing atomic mobility associated with grain boundaries. Due to the 20 nm nanostructure, grain boundary are imperfectly packed with certain free volumes and various defects, such as sub-atomic voids and dangling bonds, to accommodate the different orientations of the neighboring crystals, and grain growth occurs at room temperature.

Modeling the Effect of Solutes on Decreasing Grain Boundary Energy

The current model (see Equation 1) used to estimate the effect of various solutes on decreasing grain boundary energy for a given alloy system is given in Equation 1. The model takes into consideration the elastic enthalpy change, $\Delta E_{el}$, and the change in cohesive energy for both the lattice and grain boundary area:

$$\gamma = \gamma_0 - \frac{2\chi_A^*}{\sigma}\left[\frac{\sigma(\gamma_A^s - \gamma_{Al}^s)}{6} - \frac{\Delta H_{Mix}}{3}\left(17\chi_A^* + \frac{1}{2}\right) - \Delta E_{el}\right] \quad \text{Equation 1}$$

where $\gamma$ is the effective grain boundary energy after solute segregation; $\gamma_0$ is the initial grain boundary energy; $\chi_A^*$ is the interfacial solute concentration; $\sigma$ is the molar interfacial area and is equal to $v_B^{2/3} N_{AVG}$, where $v_B$ is the atomic volume and $N_{AVG}$ is the Avogadro number; and $\Delta H_{mix}$ is the equimolar ($x_A = x_B$) enthalpy of mixing in the liquid state. Based on Equation 1, solutes are selected [Darling, 2008, 2010]. Additionally, zinc and magnesium act as strengthening precipitates, zirconium and scandium enhance the inhibition of recrystallization, the manganese is a dispersoid phase, while the dissimilar metal of titanium is a grain refiner, and particles are added to enhance nucleation of strengthening precipitates. In summary, the desired properties can be tailored for a selected nanomaterial.

Particle-reinforced aluminum alloys have attractive specific properties with the ability to tailor such properties as elastic modulus and thermal expansion. In order to optimize the properties for a particular application, the variables such as grain size, matrix chemistry, precipitate structure, and reinforcement particle characteristics (e.g. size, shape, and volume fraction) should be optimized because they affect the mechanical properties of the resulting particle-reinforced aluminum alloys. These particles inhibit grain boundary movement during grain growth. The pinning effect of particle distribution is found to be stronger for increasing volume fraction. The primary species of precipitation strengthening are second phase particles. These particles impede the movement of dislocations throughout the lattice. Physically, this strengthening effect can be attributed both to size and modulus effects, and to interfacial or surface energy.

Precipitation hardening is an annealing technique used to increase yield strength. It relies on changes in solid solubility with temperature to produce fine particles of an impurity phase, which impede the movement of dislocations or defects in a crystal's lattice. This serves to harden the material. The presence of second phase particles often causes lattice distortions. These lattice distortions result when the precipitate particles differ in size and crystallographic structure from the host atoms. Smaller precipitate particles in a host lattice leads to tensile stress, whereas larger precipitate particles leads to compressive stress. Precipitate particles also serve by locally changing the stiffness of a material. Dislocations are repulsed by regions of higher stiffness. Furthermore, a dislocation may cut through a precipitate particle. This interaction causes an increase in the surface area of the particle.

Under certain conditions, the larger grains start to grow and the smaller grains shrink. This phenomenon, called grain growth, is thus characterized by an increase of the mean grain size at low temperature. Small second-phase particles, such as precipitates and insoluble inclusions, exert a strong pinning effect, also called Zener pinning, on the grain boundaries. They restrain the mobility of grain boundaries and eventually inhibit grain growth, limiting the final mean grain size of the composite material. Insight into the pinning effect of particles is important, since for many applications a tailored grain size is required to obtain materials with the desired properties. Examples are the addition of particles (such as precipitates, carbon nanotubes and organic or nanoparticles) to stabilize nano-crystalline materials. In most analytical studies on Zener pinning it is assumed that normal grain growth is arrested when a critical mean grain radius $(R)_{lim}$ is reached. Most often a relation of the form of Equation 2 is obtained:

$$(R)_{lim} = K\frac{1}{f_V^b} \quad \text{Equation 2}$$

where R is the radius of the second-phase particles and $f_V^b$ the volume fraction. The values of the parameters K and b vary among the different studies, depending on which assumptions are made on the shape and properties of the particles and boundaries, and on the assumptions made on the position of the particles with respect to the boundaries. This means that the dislocations are repulsed by the precipitate. This governing Equation shows that the strength is proportional to r, the radius of the precipitate particles that are nanoscale or a small r. This means that it is easier for dislocations to cut through a material with smaller second phase particles (small r).

Conventional metal alloys do not generally possess long-range-ordered crystal structures. The unique deformation properties of metals are due to non-directional metallic bonding. The metal alloy bonding provides mechanical properties that are softer and more ductile (see FIG. 4). Conversely, the predominant bonding patterns found in ceramics are highly directional covalent and ionic bonds, and consequently ceramics are generally harder and more brittle. FIG. 4a shows the ordered structure 230 of ceramics with atoms of two different types of elements. FIG. 4b shows the non-ordered structure 232 of metal alloys.

Figure 5:
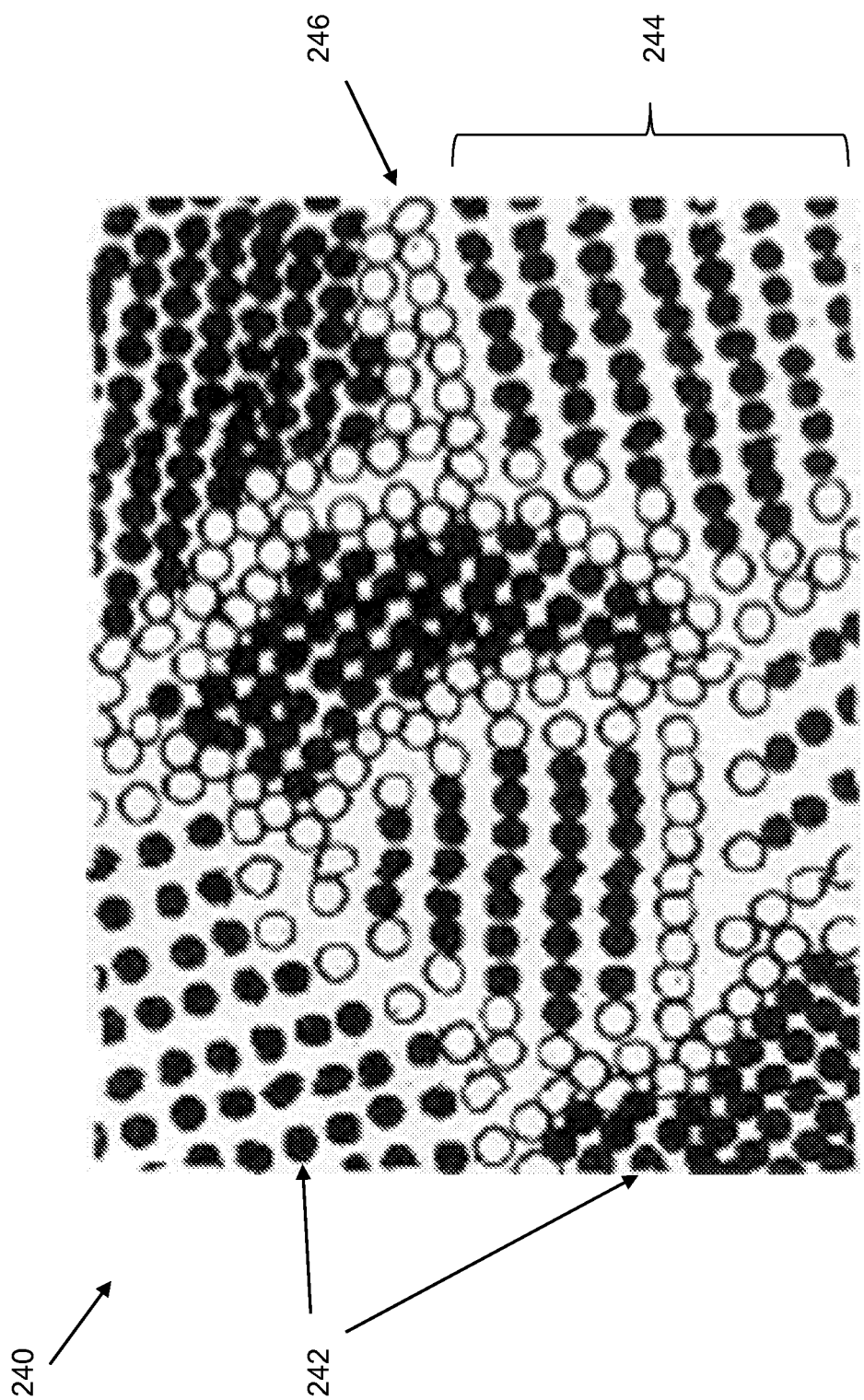
FIG. 5 shows an amorphous phase that occurs between grains.

Because of the bonding mechanisms, ceramic materials are brittle because grain boundaries cannot readily dislocate. When grain boundaries can move, the sliding process takes place by motion of the inter-granular dislocations. Furthermore, when an amorphous phase occurs between grains, it plays an essential lubricating role in the grain boundary sliding process. This is illustrated in FIG. 5, showing a nano-crystalline material 240 that has some crystalline atoms 242 associated with individual grains 244 and amorphous atoms 246 adjacent to the grains. Ductility results from the increased ease with which the ultrafine grains created by the clusters can slide by one another. This process is described as grain-boundary sliding, owing to the short diffusion distances required for the necessary local healing of incipient cracks that could otherwise form during this grain-over-grain sliding process.

Nanostructured materials suitable for use in with the exemplary apparatus and method include metal, metal alloys, metal ceramics, (especially metal carbides, and metal nitrides), inter-metallics, ceramics, or ceramic-ceramic composites. More particularly, nanostructured materials are selected from the group consisting of Cu, FeCu, FeCo, MoSi, MoC, NbC, NiCr, TiC, NiAl, Mo2Si, NiCr/Cr3C2, Fe/TiC, Mo/TiC, WC/Co, or any of the forgoing alloys with one or more of Ti, TiC, Mn, W, B, Y, Cr, Mo, Ni, Zr, Ce, Fe, Al, Si, V, and mixtures of the foregoing metals.

Grain growth inhibitors suitable for use in exemplary apparatus and method are preferably chemically inert, amenable to uniform distribution onto or at the grain boundaries of the nanostructured material, and do not subtract substantially from the chemical, physical, and mechanical properties desired in the nanomaterial. An important feature of the grain growth inhibitors is incorporated into the nanostructured material. Suitable grain growth having the above characteristics may include, but, are not limited to those known in the art, including metals, metal alloys, carbides, nitrides, inter-metallics, and ceramics. Particular grain growth inhibitors include metals such as B, Si, Al, Cr, Ni, Mo, Hf, Ta, Fe, W, Zr, Nb, and rare earth metals such as Ce, La, and Sm; metal alloys such as the foregoing alloyed with, for example, Cr, Ti, TiCr, and Mo; carbides such as silicon-based carbides and titanium-based carbides; nitrides such as aluminum-based nitrides, titanium-based nitrides, and BN; inter-metallics, including metal silicides such as AlSi and TiSi, and metal aluminides such as TiAl; and other boron compounds such as titanium boron. Boron compounds such as boron nitride produce favorable distributions, have chemical inertness, and have superior chemical, physical, and mechanical properties within the nanostructured materials.

Nanostructured material enhances diffusion. The alloying additives may be introduced at virtually any point in the nanomaterial composition melt process before electrospraying with or without a grain growth inhibitor. The alloying additive can be metal, ceramic, or composite that interacts with the melted material. Suitable alloying additives include but are not limited to, Ti, TiC, Mn, W, Y, B, Cr, Mo, Ni, Zr, Ce, Fe, Al, Si, V, alloys of the foregoing, nitrides of the foregoing, and inter-metallics of the foregoing.

Determining Stand-Off Distance to Create Nanostructures

In the exemplary electrospray apparatus 100, slurry micron-sized or nano-sized droplets are expelled from the electrospray nozzle 110 and the surface tension of the molten material 104 creates perfect spheres. As the droplets fall from the electrospray nozzle 110, they rapidly cool and reach the selected viscosity and temperature to stick to the substrate or fabricated object 178 while simultaneously having the grain growth inhibiting materials migrate to the boundary of the droplet as deposition occurs. As the droplets are deposited, the droplets are brought into contact eliminating porosity, forming bonded-nano-agglomerates while maintaining their deposition shape (i.e. splats). When exposed to the electrospray conditions, the binder precursor form small crystals, coating the nanoparticles to form connections between the nano-grains and fill the gaps between nanoparticles. In addition, this nanostructure deposition technology is directly transferable to agglomerating ceramic (WC, ZrO2, or VN) nanoparticles with a grain growth inhibiting binder for wear-resistant electrospray commercial applications.

The determination of the standoff-distance, L, is a critical parameter for the nanostructure deposition process. The nanodroplets impinge on the grounded surface that is temperature controlled. The three-dimensional structure is composed by the accumulation of small (e.g. D=10 microns) droplets of molten material from the electrospray nozzle. The droplets are at an initial temperature, $T_i$, around 1000° C. and it is desirable for them to impact the substrate or preform at a temperature, $T_f$, of around 500° C. which is below the recrystallization temperature for this formulation. The quiescent argon gas has a temperature, that is around 500° C. The droplets are ejected from the electrospray orifice at their terminal velocity.

Since droplets travel at their terminal velocities, the net force on each droplet must be zero. Hence, the weight of the droplet is offset by the buoyancy force associated with the displaced argon gas and the drag force as shown in Equation 3:

$$\rho_d g\left(\frac{\pi D^3}{6}\right) = \rho g\left(\frac{\pi D^3}{6}\right) + C_D\left(\frac{\pi D^2}{4}\right)\left(\frac{\rho V^2}{2}\right) + qE \qquad \text{Equation 3}$$

Where we ignored space charge effects, $\rho_d$ is the particle density (3160 Kg/m$^3$), g is gravity (9.8 m/s$^2$), D is the droplet diameter (10 microns=$10\times10^{-6}$ m), ρ is the argon density, V is the droplet velocity, $C_D$ is the drag coefficient, q is the charge on a droplet (14 C/Kg of droplets) and E is the driving electric field (5 kV/cm).

Since the droplets are small, it is anticipated that the Reynold's number is also small. Since, we anticipate that the Reynold's number (Re) is small, then Stokes' law may be used to express the drag coefficient (in Equation 4):

$$C_D = \frac{24}{Re} = \frac{24\upsilon}{VD} \qquad \text{Equation 4}$$

where ν is the kinematic viscosity and V is the velocity. Substituting Equation 4 into Equation 3 and solving for the velocity, V, generates Equation 5:

$$V = \frac{gD^2}{18\upsilon\rho}(\rho_d - \rho) + qE = \frac{(9.8/s^2)(10\times10^{-6}\text{m})^2(3160-0.686\ \text{kg/m}^3)}{(18)(9.53\times10^{-5}\text{m}^2/\text{s})(0.68\ \text{kg/m}^3)} + qE \qquad \text{Equation 5}$$

where the velocity, V, is calculated to be approximately 1.0026 m/s. Therefore, the Reynold's number (Re) is small (0.00027) justifying the use of Stokes law.

The Nusselt number and the heat convection coefficient can be found for this case of a freely falling sphere in a gas by using the Ranz and Marshall correlation (see Equation 6). The Ranz and Marshall correlation account for the effects of temperature gradients in the boundary layers where in the absence of chemical reactions on the surface (an inert atmosphere preserves this condition), heat conduction in the thermal boundary layer is the main heat transfer mechanism.

$$Nu = 2 + 0.6Re_D^{0.5}Pr^{0.33} = \frac{hD}{k} \text{ where } -Pr = \frac{c_p\mu}{k} \qquad \text{Equation 6}$$

The Prandtl number, Pr, is a function of the fluid properties of the argon and is found to be 0.66. The argon heat capacity, $c_P$, at 1300° K is 520 J/KgK° while the dynamic viscosity, μL, is $5.3\times10^{-5}$ W/mk and thermal conductivity, k, is 0.051 W/m ° K at these elevated temperatures. The Reynolds number is also small. Therefore, with a gas velocity close to zero, heat transfer is affected only by conduction. Consequently, the Nusselt number reduces to 2. Rearranging Equation 4 and solving for the heat transfer coefficient, h, produces Equation 7:

$$h = \frac{kNu}{D} = \frac{(0.051\ \text{W/mk})(2)}{10\times10^{-6}\ \text{m}} = 10{,}200\ \text{W/m}^2\text{K}^0 \qquad \text{Equation 7}$$

Because of the high temperatures, the blackbody behavior of the droplet must be considered. The maximum (initial) temperature of the molten droplet, $T_S$, is 1300° K that creates the largest radiation heat transfer coefficient, $h_R$ as found in Equation 8.

$$h_R = \sigma(T_S + T_\omega)(T_S^2 + T_\omega^2) = (5.67 \times 10\text{-}8 \text{ W/m}^2\text{K}^4)(1300 + 475° \text{ K})(1300^2 + 475^2 \text{K}^2) = 192 \text{ W/m}^2\text{K} \quad \text{Equation 8}$$

Since the radiative heat transfer is so much smaller than the conduction heat transfer, this radiative cooling term is ignored. The Biot number is the ratio of the heat transfer resistances inside of and at the surface of a droplet. This ratio determines whether or not the temperatures inside a droplet vary significantly in space and is calculated in Equation 9.

$$Bi = h\left(\frac{D/2}{k_D}\right) = \frac{(10{,}200 \text{ W/m}^2\text{K})(5 \times 10^{-6} \text{ m})}{(87 \text{ W/mK})} = 5 \times 10^{-4} \quad \text{Equation 9}$$

Since the Biot number is so much smaller than 1, a uniform temperature field exists inside the body.

The required time-of-flight of the particle that determines the distance-to-deposition, L, is found in Equation 10:

$$t = \frac{\rho_D V c_P}{hA_S}\ln\left(\frac{\theta_I}{\theta_F}\right) = \frac{\rho_D c_P D}{6h}\ln\left(\frac{T_I - T_\omega}{T_F - T_\omega}\right) = \quad \text{Equation 10}$$

$$\frac{(3160 \text{ kg/m}^3)(1195 \text{ J/Kg}^0\text{K})(10 \times 10^{-6} \text{ m}^3)}{6(10{,}200 \text{ W/m}^2\text{K}^0)}$$

$$\ln\frac{(1300 - 475)}{(500 - 475)}$$

$$t = 0.0021 \text{ s} \rightarrow L = Vt = (1.0026 \text{ m/s})(0.0021 \text{ s}) =$$

$$0.002 \text{ m} = 2.0 \text{ mm}$$

The critical distance-to-deposition means that the distance from the bottom of the Taylor cone to the substrate is about 2 mm. In order to get the precise deposition into such a small space, the novel extraction electrode has a combined inductive element.

Modeling of Precise Deposition of Monodispersed Droplets

A fine jet issues from the apex of the Taylor cone 150 and eventually breaks up into a spray of monodispersed droplets. The cone-jet electrospray produces monodisperse particles [Fernandez de la Mora et al. 1990]. The cone-jet electrospray produces monodisperse particles with relative ease, which is a unique capability in the nanometer scale range.

A model that tracks each droplet in a dilute two-phase flow is the result of a force balance Equation. The force balance on the droplet is revisited in Equation 3 (where the magnetic field is ignored):

$$\rho_d g\left(\frac{\pi D^3}{6}\right) = \rho g\left(\frac{\pi D^3}{6}\right) + C_D\left(\frac{\pi D^2}{4}\right)\left(\frac{\rho V^2}{2}\right) + qE \quad \text{Equation 3}$$

Where the space charge effects are ignored, $\rho_d$ is the particle density (3160 Kg/m$^3$), g is gravity (9.8 m/s$^2$), D is the droplet diameter (10 microns=10×10$^{-6}$ m), p is the argon density, V is the droplet velocity, $C_D$ is the drag coefficient, q is the charge on a droplet (14C/kg of droplets) and E is the driving electric field (5 kV/cm).

The right-hand side terms account for the drag force by the surrounding gas, the force on the droplets by the external electric field, the mutual electric force between charged droplets, and the electric force between the droplet and the induced charge on conductive substrates (image force), respectively. We have ignored the image charges induced by the charged droplets on the extractor and collector surfaces, both of which are treated as large planes. The surface charge density is assumed constant for all droplets (De Juan & Fernandez de la Mora, 1997). This assumption is reasonable for droplets used in this work, since the charge relaxation time is one order of magnitude larger than the jet breakup time. Therefore the charge remains approximately "frozen" during the jet breakup.

In this section, a spray profile model is derived to describe how the spray expands after the cone-jet breaks up. The following assumptions are used to simplify the problem where x is the distance from the electrospray nozzle to the substrate and R is the spread of the electrospray micron-sized or nanodroplets due to inertia and charge repulsion:

i. The spray consists only of monodispersed, mutually charged droplets. The inertia of the droplet is small and negligible; therefore, the motion of the droplets is dictated by the electric field, such that V=ZE, where Z is the mobility of the droplet, V is the droplet velocity, and E is the electric field. For an inertia-less droplet, $Z=q/3\pi\mu D$, where q is the charge carried by each droplet, μ, is the dynamic viscosity of the gaseous phase media, and D is the droplet diameter.

ii. The axial velocity of the droplet, $V_A$, is constant along x direction and does not vary along the radial direction. This assumption is rooted from previous experimental measurements, which show that the typical axial velocity variation is less than 10%.

iii. The volumetric charge density, p, does not vary along the radial direction, i.e. $\partial\rho/\partial r=0$. In this calculation, we show that this assumption is generally true with exception of droplets at the outskirts of the spray. This assumption yields the expression, $\rho=I_0/\pi R^2 V_A$ where $I_0$ is the electric current carried by the spray, and R is the spray radial expansion.

The x-component of the space charge field, $E_\rho$, is negligible compared to the magnitude of the driving field $E_d$. The numerically computed x-component of the space charge field, $E_\rho$, is indeed a small fraction of a typical driving field of 5 kV/cm except for a short region near x=0.

To derive the spray profile mode, we start from the law of charge conservation [see Equation 11]:

$$\nabla\cdot(\rho V) + \frac{\partial\rho}{\partial t} = 0 \quad \text{Equation 11}$$

At steady state, $\partial p/\partial t=0$ and Equation 11 becomes $\nabla\cdot(\rho V)=0$ where V=ZE [see Equation 12]:

$$ZE\cdot\nabla\rho + Z\rho\nabla\cdot E = 0 \quad \text{Equation 12}$$

In cylindrical coordinates, because ρ does not change along the radial direction, the first term of Equation 12 becomes:

$$ZE\cdot\nabla\rho = Z\left[E_x\frac{\partial\rho}{\partial t} + E_r\frac{\partial\rho}{\partial r}\right] = ZE_x\left(\frac{\partial\rho}{\partial x}\right) \quad \text{Equation 13}$$

The second term of Equation 12 can be rewritten using Gauss's law:

$$Z\rho \nabla \cdot E = Z\frac{\rho^2}{\varepsilon_0}$$ Equation 14

From Equations 12 to 14, we reach Equation 15:

$$Z\frac{\rho^2}{\varepsilon_0} + V\frac{\partial \rho}{\partial x} = 0$$ Equation 15

The solution to Equation 15 is:

$$\frac{1}{\rho} + \frac{1}{\rho_0} = \frac{Z}{\varepsilon_0 V}x$$

where V is the velocity of the micron-sized or nanodroplets, $\rho_0 = \rho(x=0)$, or at the entrance of the electrospray. Initially the droplets are linearly aligned right after cone-jet breakup, making $\rho_0$ a very large value and $1/\rho_0$ is negligible compared to $1/\rho$. On the other hand, since $V_A = E_d Z$, where Equation 16 is reduced to:

$$R = \left(\frac{I_0}{\varepsilon_0 \pi E^2 Z}x\right)^{1/2}$$ Equation 16

Equation 16 suggests that if the spray profile is viewed from the direction perpendicular to the spray axis, the profile is parabolic and also suggests that the spray diameter is inversely proportional to the intensity of the driving field.

The combination of the extractive electrode and the inductive coil is to minimize the electrospray radial expansion. The imposition of a magnetic field (to counter the radial spreading of the existing electric fields) enables precise deposition without pre-charging a surface with electron-beams. The limit of precision of this electrospray deposition method is twice the diameter of the droplet, 2D. The inductive element (coil) is imposed within the extractor electrode 122 where the force on a droplet is related to the magnetic flux density, B, the velocity of the droplet, V, and the charge on the droplet, q, as found in Equation 17:

$$F=qVB \qquad \text{Equation 17}$$

The larger the magnetic flux imposed, the closer to the precision deposition limit, 2D, one achieves. The axis of the intensity of the magnetic flux is perpendicular to the substrate for greatest precision.

Modeling of Splat Formation

Electrosprayed droplet impact dynamics can be characterized in terms of Weber, (We), and Ohnesorge, (Oh), dimensionless numbers as found in Equations 18 and 19.

$$We = \frac{\rho D^2 V^2}{\gamma} \qquad \text{Equation 18}$$

$$Oh = \frac{\mu}{(\rho\gamma D)^{0.5}} \qquad \text{Equation 19}$$

Where ρ is the liquid mass density, V is the droplet impacting velocity, D is the droplet diameter, γ is the liquid interfacial tension, and μ is the liquid dynamic viscosity. For electrosprayed droplets impacting a surface, the Weber is approximately 10 while the Ohnesorge number is around 0.1 corresponding to a relatively gentle impact without splashing. The lower impact velocity offers control of the trajectory of each droplet making it possible to build-up complex objects.

The impact of an electrosprayed droplet follows a typical three-stage sequence [Deng 2010]:

1. Impact (0-20 μs) during which the droplet contacts the heat substrate, $T_s$, and deforms from a sphere to closer to a liquid disk reaching maximum spread diameter.
2. Typical recoil (20-45 μs) during which the surface tension drives the oscillating liquid after impact is minimized due to the small size of the droplets. Even picoliter droplets do not rebound.
3. Quasi-steady solidification (>45 μs) during which the sessile droplet retains its flattened shape (described as a splat) and shrinks inducing stress. This stress is alleviated by keeping the substrate below the recrystallization temperature. If the stress was not alleviated, micro-cracking would occur.

In electrospray deposition of nanostructures, nanoparticles are of the same size and have similar thermodynamic states. In addition, uniform charging of the monodispersed droplets is imposed. For a charged droplet, the electric charge causes an additional tension along the molten liquid-gas interface that weakens the surface tension. The weakening of the surface tension has a spherodizing effect on the deposition and pulls molten liquid toward the grounded surface effectively filling any pores. Besides pore-filling that eliminates porosity, a bridging monolayer forms that bonds along the droplet interfaces. Nanoparticles, once at the droplet interfaces, can be thought of irreversibly adsorbed. Electrostatic repulsion of the charged nanoparticles causes the distribution of these materials on the surface to be uniform. These uniform features offer significant advantages in reduction of the number and size of voids or cracks in the final product. The electrosprayed nanostructures that result from the accumulation of nano-grained-pinned nano-materials determine the properties such as porosity, adhesion strength, and fracture toughness.

Control of the nanostructure produces the desired final properties. If the cooling is too rapid, amorphous structures in splats are found. Since an oxide layer is prevented from forming on the surface of splats due to an inert atmosphere, dense microstructures with excellent inter-splat bonding can be produced. Equiaxed nano-crystals are formed that have more planes on which to slip that result in a higher strength and ductility. The restricted growth of the amorphous structures is attributed to the extreme cooling rate of the electrospray deposition process and thus results in an equiaxed nanostructured matrix. The presence of these nano-grains plays a significant role (according to the Hall-Petch relationship) in enhancing the tensile strength of the deposited materials.

Modeling of Droplet Size: Splat-Size from Monodispersed Droplets

In cone-jet mode, the droplet size scales with the liquid flow rate, and is inversely proportional to the liquid conductivity. Theoretically droplet sizes, $d_p$ can be determined from the following scaling law, confirmed by many experiments (Jaworek 2007)[see Equation 20].

$$d_D = \alpha\left(\frac{Q^3\varepsilon_0\rho}{\pi^4\sigma\gamma}\right)^{1/6} (\alpha = 2.9) \quad \text{Equation 20}$$

where $\varepsilon_0$ is the vacuum permittivity, $\rho$ is the density of the fluid, $\gamma$ is the surface tension, Q is the volume flow rate of the liquid, and $\sigma$ is the conductivity of the fluid. In general, droplet size decreases with decreasing flow rate and increasing electrical conductivity of the liquid. By adjusting the flow rate and the liquid properties, droplets with the desired size can be produced in a well-controlled manner. Frequently, the initial solution contains both solvent and solute, and the final nanoparticle size ($d_p$) is related to the initial droplet size $d_D$) by the following Equation 21:

$$d_p = D\left(\frac{C\rho}{\rho_P}\right)^{1/3} \quad \text{Equation 21}$$

where C is the concentration of solute and $\rho_p$ is the density of the particle.

In order to achieve reasonable production rates, multiple electrospray nozzles producing larger droplets can be used. These droplets are generally composed of nanoparticles with a melted wetting material that enables bonding between nano-grains and pinning compounds to reach the interface.

Determining Optimum Amount of Binder/Wetting Agent

The concentration of the molten or fluidic mixture determines the droplet fluid composition. Because the inductive heating causes the particles and the molten binder to mix, nanoparticle concentration and consequently the material properties can be selected for optimum nanoscale properties. For example, the density of a nano-ceramic can be determined, based on a titanium matrix, if the nano-ceramic contains 50 wt. % WC, 22 wt. % TaC, and 14 wt. % TiC. The final density is 9.408 g/cm³. Since most ceramic materials are not wetted by molten alloys, the introduction and retention of the nano-ceramic particulates necessitate either adding wetting agents to the melt or coating the ceramic particulates prior to mixing. It is possible to melt infiltrate ceramic materials that are coated onto nanoparticles.

One can estimate a porosity of the nano-ceramic by measuring the final density. For example, if one assumes the ceramic nanoparticles weigh 86 g, and the amount of infiltrating titanium, Ti, is 14 g, it is providing an estimation pathway for the final porosity of the nanomaterial. The final density of the nano-ceramic is 9.408 g/cm³. We can determine the original pore volume, $V_{Pore}$ [see Equation 22].

$$f_{WC} = \frac{50 \text{ g WC}/15.77 \text{ g/cm}^3}{(50/15.77) + (22/14.5) + (14/4.94) + (14/4.507) + V_{Pore}} \quad \text{Equation 22}$$

$$f_{TaC} = \frac{22 \text{ g TaC}/14.5 \text{ g/cm}^3}{(50/15.77) + (22/14.5) + (14/4.94) + (14/4.507) + V_{Pore}}$$

$$f_{TiC} = \frac{14 \text{ g TiC}/4.94 \text{ g/cm}^3}{(50/15.77) + (22/14.5) + (14/4.94) + (14/4.507) + V_{Pore}}$$

$$f_{Ti} = \frac{14 \text{ g Ti}/4.507 \text{ g/cm}^3}{(50/15.77) + (22/14.5) + (14/4.94) + (14/4.507) + V_{Pore}}$$

$$f_{Pore} = \frac{V_{Pore}}{(50/15.77) + (22/14.5) + (14/4.94) + (14/4.507) + V_{Pore}}$$

The total volume is calculated from the nano-ceramic volume of 10.627 cm³ with a pore volume, $V_{Pore}$ of 0.00225 is 10.629 cm³. The fraction of the nano-ceramic that is interconnected prior to the titanium infiltration or pore coating, $f_{Interconnected}$ is 0.292 ($f_{interconnected}$=(14 g/4.507 g/cm³)/10.629 cm³) that is equal to the volume fraction of the titanium that fills the interconnected pores. Alternately, the volume fraction of the closed porosity is obtained from $V_{pore}$ determination (0.0022 cm³), the volume fraction of closed porosity, $f$ pore, is 0.0022/10.629 that equals 2.0× $10^{-4}$ refers to the total volume of closed pores or filled-pores. The coating of the nanoparticles essentially eliminates porosity (without needing sintering that destroys the nanocharacteristics. However, excessive molten liquid (i.e. binder or wetting agent) results in solidification similar to casting process while too little binder results in a porous structure. As shown in FIGS. 10a and 10b, the formation of a stable nonporous nanostructure depends on the correct amount of molten liquid in conjunction with the monolayer bridging to form bonds.

Example 1: Tungsten-Carbide/Cobalt

The apparatus and method described herein were used to create three-dimensional parts of Tungsten-Carbide/Cobalt (WC/Co). The electrospray apparatus produced 50 micron droplets composed of WC nanoparticles embedded into a melted Co matrix at 5 kV/cm driving force.

The result was that over 99% of the dense free-standing objects produced retained the nano-ceramic characteristic properties desired. An X-ray diffraction (XRD) pattern of the nanostructured WC/Co produced a B(2Θ) number that is directly related to the atomic spacing and is the true broadening of the diffraction line measured at half maximum intensity. Only the presence of a well-defined nano-crystalline phase of WC and some amount of Co were noticed. These results reveal that the nanocharacteristics were preserved during the electrospray process.

The result of the using the exemplary electrospray apparatus and methods for depositing conventional cermet formulations (the WC formulation above) was that the free-standing three dimensional objects produced retained the nano-ceramic characteristic properties desired. The electrospray deposition achieved rates of greater than 12.8 cm³/min (approximately 0.8 in³/min). Sintering that destroyed the nanocharacteristics and created porous materials was eliminated.

| Property | WC/Co with the exemplary method | WC/Co with conventional methods |
|---|---|---|
| Hardness (HV) | 1900 | 1500 |
| Modulus of Elasticity (GPa) | 673 | 510 |
| Transverse Rupture Strength (MPa) | 3100 | 2000 |

-continued

| Property | WC/Co with the exemplary method | WC/Co with conventional methods |
|---|---|---|
| Coefficient of Thermal Expansion (ppm/K) | 5.0 | 6.1 |
| Density (g/cm3) | 15.0 | 11.4 |

Example 2: Nano-Metal Composed of Steel Deposition of Monodispersed Droplets

The apparatus and method described herein were used to create nanostructured steel. The molten precursor was incorporated into already melted compositions that were directly electrosprayed. The starting materials were nanoscale particles due to the reduction of melting temperatures associated with reduced size particles. The nanostructured steel was comprised of the same elements as conventional 314 stainless steel, well known in the literature (chromium [Cr] 25%, nickel [Ni] 20%, manganese [Mn] 2%, silicon [Si] 2%, carbon [C] 0.25%, and a balance of iron [Fe] with traces of sulfur [S] and phosphorous [P]. The difference was the addition of chromium carbide, [$Cr_3C_2$] 0.88% used as the pinning compound that was electrosprayed deposited with the same approximate final composition as conventional 314.

The nanostructured steel had an order-of-magnitude greater properties than conventional stainless steel. Conventional stainless steel has a hardness of 1.5 GPa while the nanostructured steel exhibited a hardness of 15 GPa. Similarly, conventional stainless steel has a fracture toughness of 120 $MPam^{0.5}$ while its nanostructured counterpart tolerated 300 $MPam^{0.5}$. In summary, an order-of-magnitude greater properties were achieved by maintaining the nanocharacteristics.

What is claimed is:

1. An apparatus for fabrication of objects retaining nanoscale characteristics comprising;
   a material reservoir configured to hold a molten material, wherein at least a portion of the molten material includes a composition of grain growth inhibitor particles in a solution with a binding agent;
   a nozzle coupled to the material reservoir;
   a moving stage configured to move relative to the nozzle in three orthogonal dimensions;
   an object holder, part of the moving stage, configured to hold an object comprising successive deposition layers;
   an extractor electrode coupled to the nozzle, the extractor electrode configured to generate an electrical field, the electric field configured to extract the molten material from the nozzle to form a stream of droplets of nanoparticle size, the electric field configured to drive the droplets to the moving stage, wherein the extractor electrode is configured to generate a magnetic field, the magnetic field configured to limit dispersion of the stream of droplets;
   a profilometer configured to obtain profile data of the object; and
   a main control unit configured to control movement of the moving stage in response to the obtained profile data of the object, including moving the moving stage laterally with respect to the nozzle as the stream of droplets impacts the moving stage to form a current deposition layer of the object and moving the moving stage vertically with respect to the nozzle to maintain a target stand-off distance between the nozzle and a previous deposition layer of the object, based on profile data of the previous deposition layer.

2. The apparatus of claim 1, further comprising:
   an enclosure coupled to and penetrated by the nozzle, the enclosure defining an enclosure cavity between the enclosure and the moving stage; and
   an enclosure floating frame slidingly coupled to the enclosure, the enclosure floating frame configured to provide a seal between the enclosure and the moving stage.

3. The apparatus of claim 2, further comprising:
   a gas inlet configured to add a heated gas into the enclosure cavity.

4. The apparatus of claim 1, further comprising:
   a cooling chuck, part of the moving stage, coupled to the object holder, the cooling chuck configured to cool the object holder.

5. The apparatus of claim 1, wherein the main control unit is further configured to adjust a flow rate of the molten material through the nozzle to correct deposition errors, based on the profile data of the previous deposition layer.

6. The apparatus of claim 1, further comprising:
   a radiation source configured to heat the stream of droplets.

7. The apparatus of claim 1, further comprising:
   a heater configured to provide heat to the stream of droplets.

8. The apparatus of claim 1, wherein the main control unit is further configured to control electrical conditions associated with the electric field.

\* \* \* \* \*